(12) United States Patent
Dimou et al.

(10) Patent No.: US 12,028,863 B2
(45) Date of Patent: Jul. 2, 2024

(54) DYNAMIC INDICATION OF PHYSICAL DOWNLINK CONTROL CHANNEL MONITORING LOCATION

(71) Applicant: QUALCOMM Incorporated, San Diego, CA (US)

(72) Inventors: Konstantinos Dimou, San Francisco, CA (US); Yan Zhou, San Diego, CA (US); Junyi Li, Chester, NJ (US); Tao Luo, San Diego, CA (US); Mahmoud Taherzadeh Boroujeni, San Diego, CA (US); Hamed Pezeshki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 420 days.

(21) Appl. No.: 16/948,834

(22) Filed: Oct. 1, 2020

(65) Prior Publication Data

US 2021/0105747 A1    Apr. 8, 2021

Related U.S. Application Data

(60) Provisional application No. 62/910,114, filed on Oct. 3, 2019.

(51) Int. Cl.
*H04L 5/00* (2006.01)
*H04W 72/23* (2023.01)
(52) U.S. Cl.
CPC ................... *H04W 72/23* (2023.01)

(58) Field of Classification Search
CPC ............ H04W 72/042; H04W 52/0216; Y02D 30/70; H04L 5/0053; H04L 5/0078; H04L 5/0094

See application file for complete search history.

(56) References Cited

U.S. PATENT DOCUMENTS

| 2011/0105167 | A1* | 5/2011 | Pan ...................... H04B 7/0671 455/507 |
| 2019/0103943 | A1* | 4/2019 | Wang .................... H04L 1/1854 |
| 2019/0150124 | A1 | 5/2019 | Nogami et al. |
| 2019/0363843 | A1* | 11/2019 | Gordaychik .............. H04L 1/08 |
| 2020/0084747 | A1* | 3/2020 | Hong .................... H04W 72/23 |

(Continued)

FOREIGN PATENT DOCUMENTS

| WO | 2019113834 A1 | 6/2019 |
| WO | 2019114482 A1 | 6/2019 |

OTHER PUBLICATIONS

International Search Report and Written Opinion—PCT/US2020/070612—ISA/EPO—dated Jan. 21, 2021.

*Primary Examiner* — Christine Ng
(74) *Attorney, Agent, or Firm* — Harrity & Harrity, LLP

(57) ABSTRACT

A user equipment (UE) may receive an indication associated with receiving downlink control information (DCI) communications. The indication may identify a first physical downlink control channel (PDCCH) monitoring location associated with receiving DCI communications during a first period of time, and a second PDCCH monitoring location associated with receiving DCI communications during a second period of time that follows the first period of time. The UE may monitor in the first PDCCH monitoring location and the second PDCCH monitoring location based at least in part on the indication.

28 Claims, 13 Drawing Sheets

(56) References Cited

U.S. PATENT DOCUMENTS

| | | | | |
|---|---|---|---|---|
| 2020/0196285 A1* | 6/2020 | Zhuang | ............... | H04W 72/04 |
| 2020/0260418 A1* | 8/2020 | Xue | .................... | H04W 72/04 |
| 2020/0280969 A1* | 9/2020 | Liu | ..................... | H04L 5/0053 |
| 2020/0336193 A1* | 10/2020 | Park | ..................... | H04W 76/28 |
| 2021/0006376 A1* | 1/2021 | Cirik | .................... | H04L 5/0055 |
| 2021/0153262 A1* | 5/2021 | Mochizuki | .......... | H04W 74/006 |

* cited by examiner

DYNAMIC INDICATION OF PHYSICAL DOWNLINK CONTROL CHANNEL MONITORING LOCATION

CROSS-REFERENCE TO RELATED APPLICATION

This Patent Applications claims priority to U.S. Provisional Patent Application No. 62/910,114, filed on Oct. 3, 2019, entitled "DYNAMIC INDICATION OF PHYSICAL DOWNLINK CONTROL CHANNEL MONITORING LOCATION," and assigned to the assignee hereof. The disclosure of the prior Applications is considered part of and is incorporated by reference into this Patent Applications.

FIELD OF THE DISCLOSURE

Aspects of the present disclosure generally relate to wireless communication and to techniques and apparatuses for dynamic indication of physical downlink control channel (PDCCH) monitoring location.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving an indication identifying a physical downlink control channel (PDCCH) monitoring location associated with receiving a next downlink control information (DCI) communication; and monitoring in the PDCCH monitoring location based at least in part on the indication, wherein the indication is valid at least until the PDCCH monitoring location irrespective of an amount of time between receiving the indication and monitoring in the PDCCH monitoring location.

In some aspects, a UE for wireless communication may include memory and one or more processors operatively coupled to the memory. The memory and the one or more processors may be configured to receive an indication identifying a PDCCH monitoring location associated with receiving a next DCI communication; and monitor in the PDCCH monitoring location based at least in part on the indication, wherein the indication is valid at least until the PDCCH monitoring location irrespective of an amount of time between receiving the indication and monitoring in the PDCCH monitoring location.

In some aspects, a non-transitory computer-readable medium may store one or more instructions for wireless communication. The one or more instructions, when executed by one or more processors of a UE, may cause the one or more processors to: receive an indication identifying a PDCCH monitoring location associated with receiving a next DCI communication; and monitor in the PDCCH monitoring location based at least in part on the indication, wherein the indication is valid at least until the PDCCH monitoring location irrespective of an amount of time between receiving the indication and monitoring in the PDCCH monitoring location.

In some aspects, an apparatus for wireless communication may include means for receiving an indication identifying a PDCCH monitoring location associated with receiving a next DCI communication; and means for monitoring in the PDCCH monitoring location based at least in part on the indication, wherein the indication is valid at least until the PDCCH monitoring location irrespective of an amount of time between receiving the indication and monitoring in the PDCCH monitoring location.

In some aspects, a method of wireless communication, performed by a base station, may include transmitting an indication identifying a PDCCH monitoring location associated with transmitting a next DCI communication, wherein the indication is valid at least until the PDCCH monitoring location irrespective of an amount of time between receiving the indication and monitoring in the PDCCH monitoring location; and transmitting the next DCI communication after transmitting the indication.

In some aspects, a base station for wireless communication may include memory and one or more processors operatively coupled to the memory. The memory and the one or more processors may be configured to transmit an indication identifying a PDCCH monitoring location associated with transmitting a next DCI communication, wherein the indication is valid at least until the PDCCH monitoring location irrespective of an amount of time between receiving the indication and monitoring in the PDCCH monitoring location; and transmit the next DCI communication after transmitting the indication.

In some aspects, a non-transitory computer-readable medium may store one or more instructions for wireless communication. The one or more instructions, when executed by one or more processors of a base station, may cause the one or more processors to: transmit an indication identifying a PDCCH monitoring location associated with transmitting a next DCI communication, wherein the indication is valid at least until the PDCCH monitoring location irrespective of an amount of time between receiving the indication and monitoring in the PDCCH monitoring location; and transmit the next DCI communication after transmitting the indication.

In some aspects, an apparatus for wireless communication may include means for transmitting an indication identifying a PDCCH monitoring location associated with transmitting a next DCI communication, wherein the indication is valid at least until the PDCCH monitoring location irrespective of an amount of time between receiving the indication and monitoring in the PDCCH monitoring location; and means for transmitting the next DCI communication after transmitting the indication.

In some aspects, a method of wireless communication, performed by a UE, may include receiving an indication associated with receiving DCI communications, the indication identifying: a first PDCCH monitoring location associated with receiving DCI communications during a first period of time, and a second PDCCH monitoring location associated with receiving DCI communications during a second period of time that follows the first period of time; and monitoring in the first PDCCH monitoring location and the second PDCCH monitoring location based at least in part on the indication.

In some aspects, a UE for wireless communication may include memory and one or more processors operatively coupled to the memory. The memory and the one or more processors may be configured to receive an indication associated with receiving DCI communications, the indication identifying: a first PDCCH monitoring location associated with receiving DCI communications during a first period of time, and a second PDCCH monitoring location associated with receiving DCI communications during a second period of time that follows the first period of time; and monitor in the first PDCCH monitoring location and the second PDCCH monitoring location based at least in part on the indication.

In some aspects, a non-transitory computer-readable medium may store one or more instructions for wireless communication. The one or more instructions, when executed by one or more processors of a UE, may cause the one or more processors to: receive an indication associated with receiving DCI communications, the indication identifying: a first PDCCH monitoring location associated with receiving DCI communications during a first period of time, and a second PDCCH monitoring location associated with receiving DCI communications during a second period of time that follows the first period of time; and monitor in the first PDCCH monitoring location and the second PDCCH monitoring location based at least in part on the indication.

In some aspects, an apparatus for wireless communication may include means for receiving an indication associated with receiving DCI communications, the indication identifying: a first PDCCH monitoring location associated with receiving DCI communications during a first period of time, and a second PDCCH monitoring location associated with receiving DCI communications during a second period of time that follows the first period of time; and means for monitoring in the first PDCCH monitoring location and the second PDCCH monitoring location based at least in part on the indication.

In some aspects, a method of wireless communication, performed by a base station, may include transmitting an indication associated with transmitting DCI communications, the indication identifying: a first PDCCH monitoring location associated with DCI communications to be transmitted during a first period of time, and a second PDCCH monitoring location associated with DCI communications to be transmitted during a second period of time that follows the first period of time; and transmitting a DCI communication in at least one of the first PDCCH monitoring location or the second PDCCH monitoring location after transmitting the indication.

In some aspects, a base station for wireless communication may include memory and one or more processors operatively coupled to the memory. The memory and the one or more processors may be configured to transmit an indication associated with transmitting DCI communications, the indication identifying: a first PDCCH monitoring location associated with DCI communications to be transmitted during a first period of time, and a second PDCCH monitoring location associated with DCI communications to be transmitted during a second period of time that follows the first period of time; and transmit a DCI communication in at least one of the first PDCCH monitoring location or the second PDCCH monitoring location after transmitting the indication.

In some aspects, a non-transitory computer-readable medium may store one or more instructions for wireless communication. The one or more instructions, when executed by one or more processors of a base station, may cause the one or more processors to: transmit an indication associated with transmitting DCI communications, the indication identifying: a first PDCCH monitoring location associated with DCI communications to be transmitted during a first period of time, and a second PDCCH monitoring location associated with DCI communications to be transmitted during a second period of time that follows the first period of time; and transmit a DCI communication in at least one of the first PDCCH monitoring location or the second PDCCH monitoring location after transmitting the indication.

In some aspects, an apparatus for wireless communication may include means for transmitting an indication associated with transmitting DCI communications, the indication identifying: a first PDCCH monitoring location associated with DCI communications to be transmitted during a first period of time, and a second PDCCH monitoring location associated with DCI communications to be transmitted during a second period of time that follows the first period of time; and means for transmitting a DCI communication in at least one of the first PDCCH monitoring location or the second PDCCH monitoring location after transmitting the indication.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
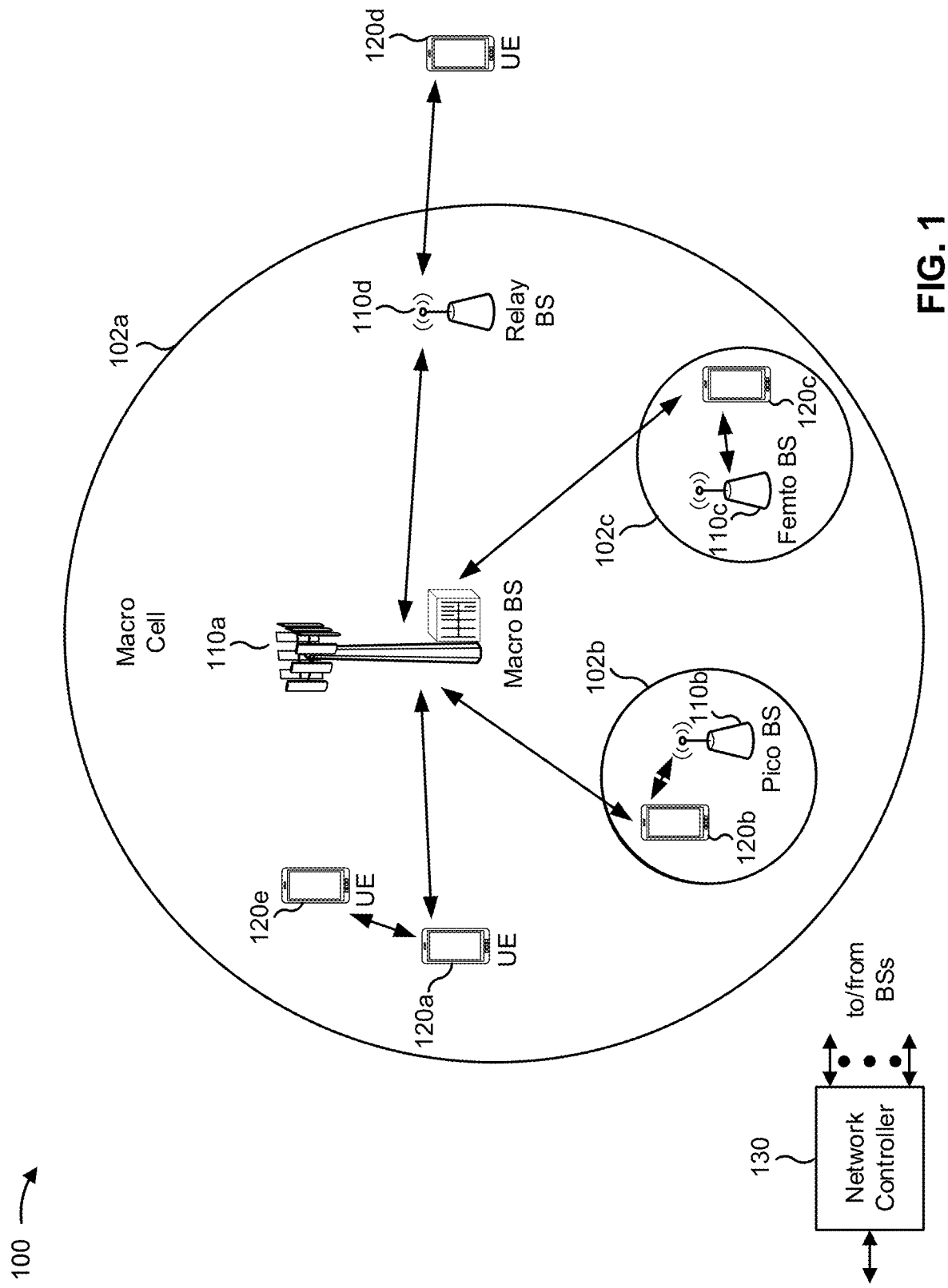
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
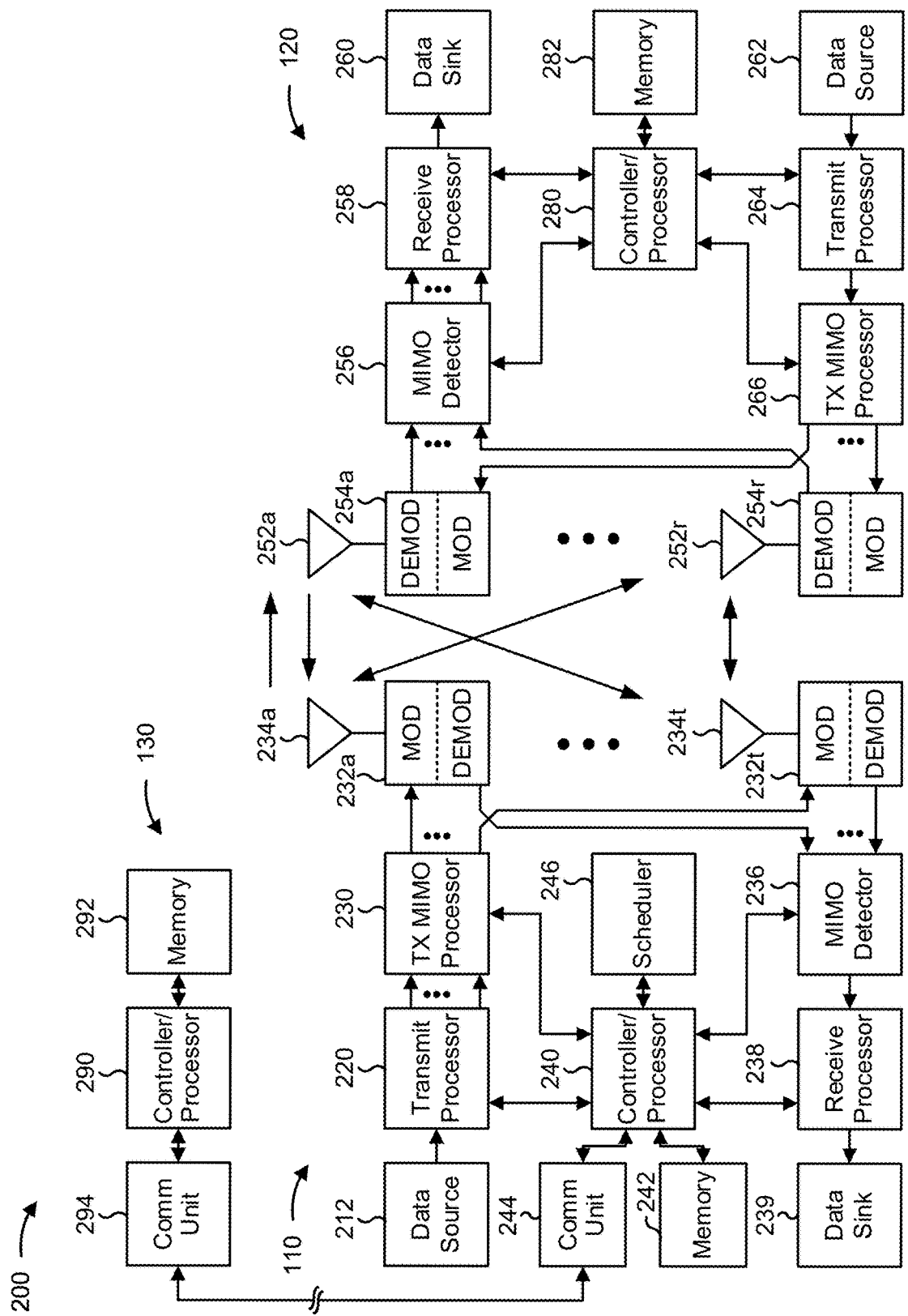
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with dynamic indication of PDCCH monitoring location, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 600 of FIG. 6, process 700 of FIG. 7, process 900 of FIG. 9, process 1000 of FIG. 10, and/or other processes as described herein. A scheduler 246 may schedule UEs for data transmission on the downlink and/or uplink.

In some aspects, UE 120 may include means for receiving an indication identifying a PDCCH monitoring location associated with receiving a next DCI communication; means for monitoring in the PDCCH monitoring location based at least in part on the indication, wherein the indication is valid at least until the PDCCH monitoring location irrespective of an amount of time between receiving the indication and monitoring in the PDCCH monitoring location; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, UE 120 may include means for receiving an indication associated with receiving DCI communications, the indication identifying: a first PDCCH monitoring location associated with receiving DCI communications during a first period of time, and a second PDCCH monitoring location associated with receiving DCI communications during a second period of time that follows the first period of time; means for monitoring in the first PDCCH monitoring location and the second PDCCH monitoring location based at least in part on the indication; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting an indication identifying a PDCCH monitoring location associated with transmitting a next DCI communication, wherein the indication is valid at least until the PDCCH monitoring location irrespective of an amount of time between receiving the indication and monitoring in the PDCCH monitoring location; means for transmitting the next DCI communication after transmitting the indication; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, base station 110 may include means for transmitting an indication associated with transmitting DCI communications, the indication identifying: a first PDCCH monitoring location associated with DCI communications to be transmitted during a first period of time, and a second PDCCH monitoring location associated with DCI communications to be transmitted during a second period of time that follows the first period of time; means for transmitting a DCI communication in at least one of the first PDCCH monitoring location or the second PDCCH monitoring location after transmitting the indication; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
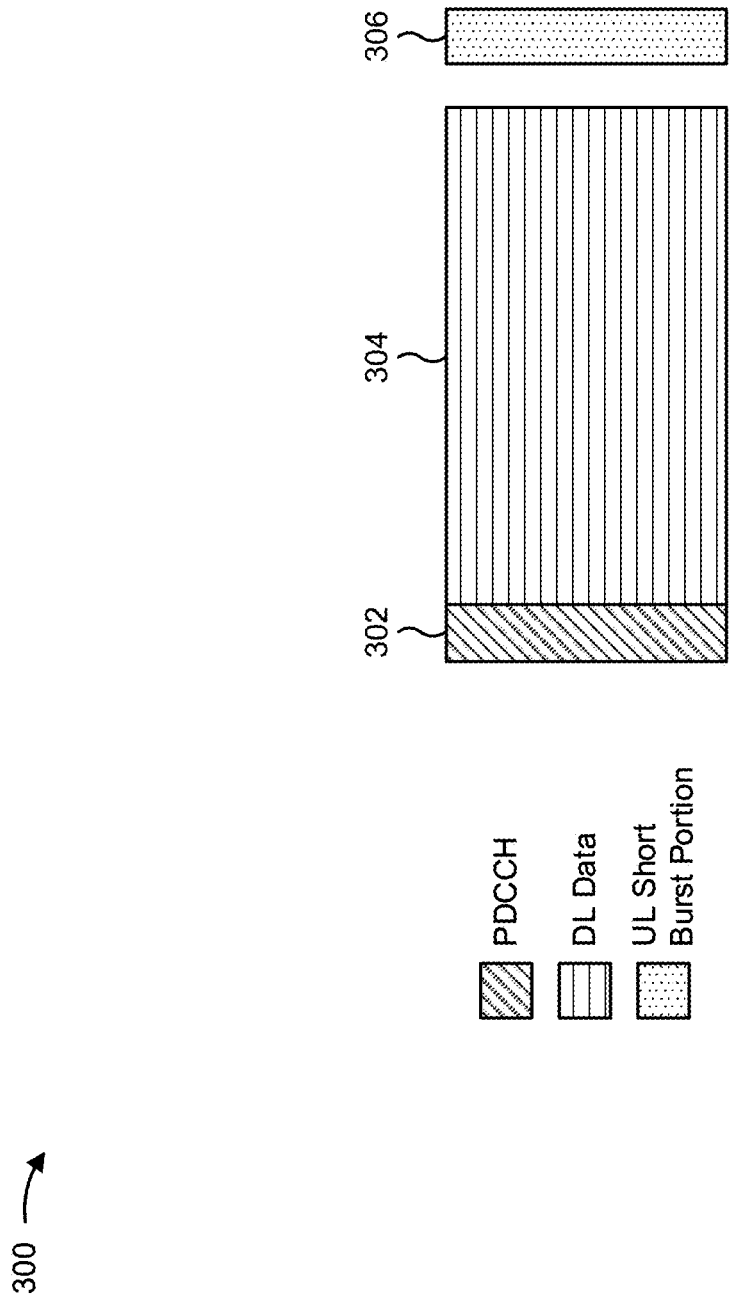
FIG. 3 is a diagram illustrating an example of a downlink (DL)-centric slot, in accordance with various aspects of the present disclosure.

FIG. 3 is a diagram 300 showing an example of a DL-centric slot or wireless communication structure. The DL-centric slot may include a control portion 302. The control portion 302 may exist in the initial or beginning portion of the DL-centric slot. The control portion 302 may include various scheduling information and/or control information corresponding to various portions of the DL-centric slot. In some configurations, the control portion 302 may be a physical DL control channel (PDCCH), as indicated in FIG. 3. In some aspects, the control portion 302 may include legacy PDCCH information, shortened PDCCH (sPDCCH) information), a control format indicator (CFI) value (e.g., carried on a physical control format indicator channel (PC-FICH)), one or more grants (e.g., downlink grants, uplink grants, and/or the like), and/or the like.

The DL-centric slot may also include a DL data portion 304. The DL data portion 304 may sometimes be referred to as the payload of the DL-centric slot. The DL data portion 304 may include the communication resources utilized to communicate DL data from the scheduling entity (e.g., UE or BS) to the subordinate entity (e.g., UE). In some configurations, the DL data portion 304 may be a physical DL shared channel (PD SCH).

The DL-centric slot may also include an UL short burst portion 306. The UL short burst portion 306 may sometimes be referred to as an UL burst, an UL burst portion, a common UL burst, a short burst, an UL short burst, a common UL short burst, a common UL short burst portion, and/or various other suitable terms. In some aspects, the UL short burst portion 306 may include one or more reference signals. Additionally, or alternatively, the UL short burst portion 306 may include feedback information corresponding to various other portions of the DL-centric slot. For example, the UL short burst portion 306 may include feedback information corresponding to the control portion 302 and/or the data portion 304. Non-limiting examples of information that may be included in the UL short burst portion 306 include an ACK signal (e.g., a physical uplink control channel (PUCCH) ACK, a physical uplink shared channel (PUSCH) ACK, an immediate ACK), a NACK signal (e.g., a PUCCH NACK, a PUSCH NACK, an immediate NACK), a scheduling request (SR), a buffer status report (BSR), a hybrid automatic repeat request (HARD) indicator, a channel state indication (CSI), a channel quality indicator (CQI), a sounding reference signal (SRS), a demodulation reference signal (DMRS), PUSCH data, and/or various other suitable types of information. The UL short burst portion 306 may include additional or alternative information, such as information pertaining to random access channel (RACH) procedures, scheduling requests, and various other suitable types of information.

As illustrated in FIG. 3, the end of the DL data portion 304 may be separated in time from the beginning of the UL short burst portion 306. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is one example of a DL-centric wireless communication structure, and alternative structures having similar features may exist without necessarily deviating from the aspects described herein.

As indicated above, FIG. 3 is provided as an example. Other examples may differ from what is described with regard to FIG. 3.

Figure 4:
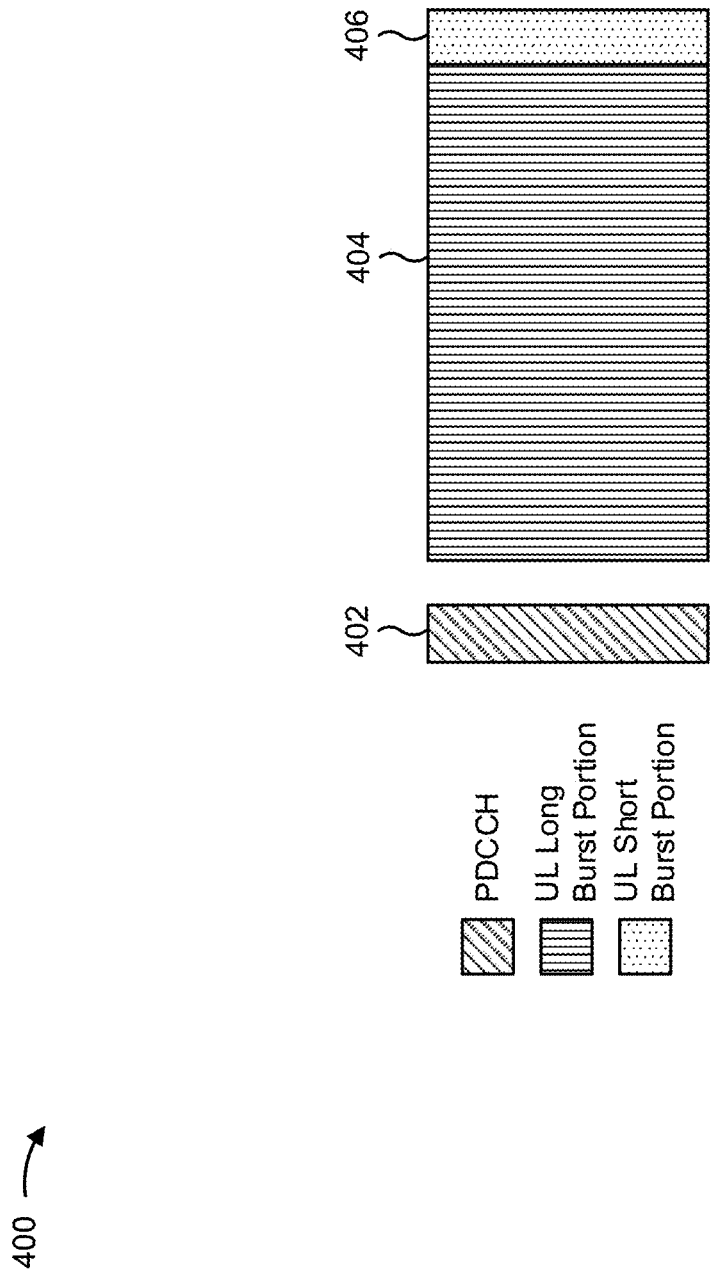
FIG. 4 is a diagram illustrating an example of an uplink (UL)-centric slot, in accordance with various aspects of the present disclosure.

FIG. 4 is a diagram 400 showing an example of an UL-centric slot or wireless communication structure. The UL-centric slot may include a control portion 402. The control portion 402 may exist in the initial or beginning portion of the UL-centric slot. The control portion 402 in FIG. 4 may be similar to the control portion 302 described above with reference to FIG. 3. The UL-centric slot may also include an UL long burst portion 404. The UL long burst portion 404 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 402 may be a physical DL control channel (PDCCH).

As illustrated in FIG. 4, the end of the control portion 402 may be separated in time from the beginning of the UL long burst portion 404. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an UL short burst portion 406. The UL short burst portion 406 in FIG. 4 may be similar to the UL short burst portion 306 described above with reference to FIG. 3, and may include any of the information described above in connection with FIG. 3. The foregoing is one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some aspects, the sidelink signals may be communicated using a licensed spectrum (unlike wireless local area networks, which typically use an unlicensed spectrum).

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIG. 4 is provided as an example. Other examples may differ from what is described with regard to FIG. 4.

In a wireless communication system, such as an NR system, a downlink control information (DCI) communication may include control information, such as information associated with resource allocation (e.g., a set of resources to be used for a downlink shared channel, a set of resources to be used for an uplink shared channel, and/or the like), a transport format, and/or one or more other items of control information. Such a DCI communication is carried in a physical downlink control channel (PDCCH), which is communicated in one or more control resource sets (CORESETs).

A UE (e.g., UE 120) may be configured to monitor a PDCCH so that the UE can detect a DCI communication intended for the UE. In a typical communication scenario, the UE performs a blind search for a DCI communication in every slot (e.g., by attempting to decode the PDCCH in one or more CORESETs). However, this so-called blind decoding results in wasted power at the UE. For example, in the typical communication scenario described above, over 40% of total UE power may be consumed by the UE monitoring the PDCCH without any scheduling grant for the UE.

The power consumption issue persists even in scenarios in which it is not obvious that a UE would need to frequently monitor for DCI communications, such as when the UE is configured with semi-persistent scheduling (SPS) or a configured grant. For example, the UE may need to monitor for a DCI communication in association with activating the SPS/configured grant. As another example, the UE configured with the SPS/configured grant may need to monitor for a DCI communication after a beam quality issue causes the UE to fail to receive a downlink communication (e.g., a physical downlink shared channel (PDSCH) communication). Here, after failing to receive (e.g., failing to decode) the downlink communication, the UE may transmit a negative acknowledgment (NACK) indicating the beam quality issue. After transmitting the NACK, the UE may monitor (within one or more CORESETs) for a DCI communication associated with initiating a beam sweep for beam re-selection/adaptation and re-transmission of downlink communication. This issue is particularly prevalent when operating in a high frequency range, such as Frequency Range 2 (FR2), because beam quality issues are more likely in high frequency ranges. Thus, monitoring for DCI communications can result in wasted UE power even where it is not obvious that a UE would need to frequently monitor for DCI communications.

One technique for resolving the power consumption issue caused by monitoring for DCI communications is to allow a base station to signal a location of a PDCCH that may carry DCI communications for a given UE (herein referred to as a PDCCH monitoring location). According to this technique, the PDCCH monitoring location is valid for a particular number of slots, after which the signaled PDCCH monitoring location expires. Here, content of DCI communications in terms of resource block allocation can differ among occurrences of the signaled PDCCH monitoring location, and a beam used for the DCI communications may differ across the occurrences of the signaled PDCCH monitoring location. However, this technique restricts flexibility in association with receiving and transmitting DCI communications. For example, from the UE perspective, the lack of flexibility means that the UE must always search the same PDCCH monitoring location on the same part of the bandwidth (e.g., even if the UE is using another part of the bandwidth for transmitting or receiving other communications). As another example, from the base station perspective, the base station must reserve resources of the signaled PDCCH monitoring occasion for the period of time during which the signaled PDCCH monitoring occasion is valid, which may reduce resource utilization and/or usage efficiency.

Some aspects herein provide techniques and apparatuses for dynamic indication of a PDCCH monitoring location. In some aspects, a base station may transmit, and a UE may receive, an indication identifying a PDCCH monitoring location associated with a next DCI communication. In some aspects, the indication may be valid at least until the PDCCH monitoring location, irrespective of an amount of time between receiving the indication and monitoring in the PDCCH monitoring location. Further details associated with this technique are provided below with regard to FIGS. 5A-5C, 6, and 7.

Alternatively, in some aspects, a base station may transmit, and a UE may receive, an indication identifying a first PDCCH monitoring location associated with receiving DCI communications during a first period of time, and a second PDCCH monitoring location associated with receiving DCI communications during a second period of time (e.g., a period of time that follows the first period of time). Further details associated with this technique are provided below with regard to FIGS. 8A, 8B, 9, and 10.

Figure 5A:
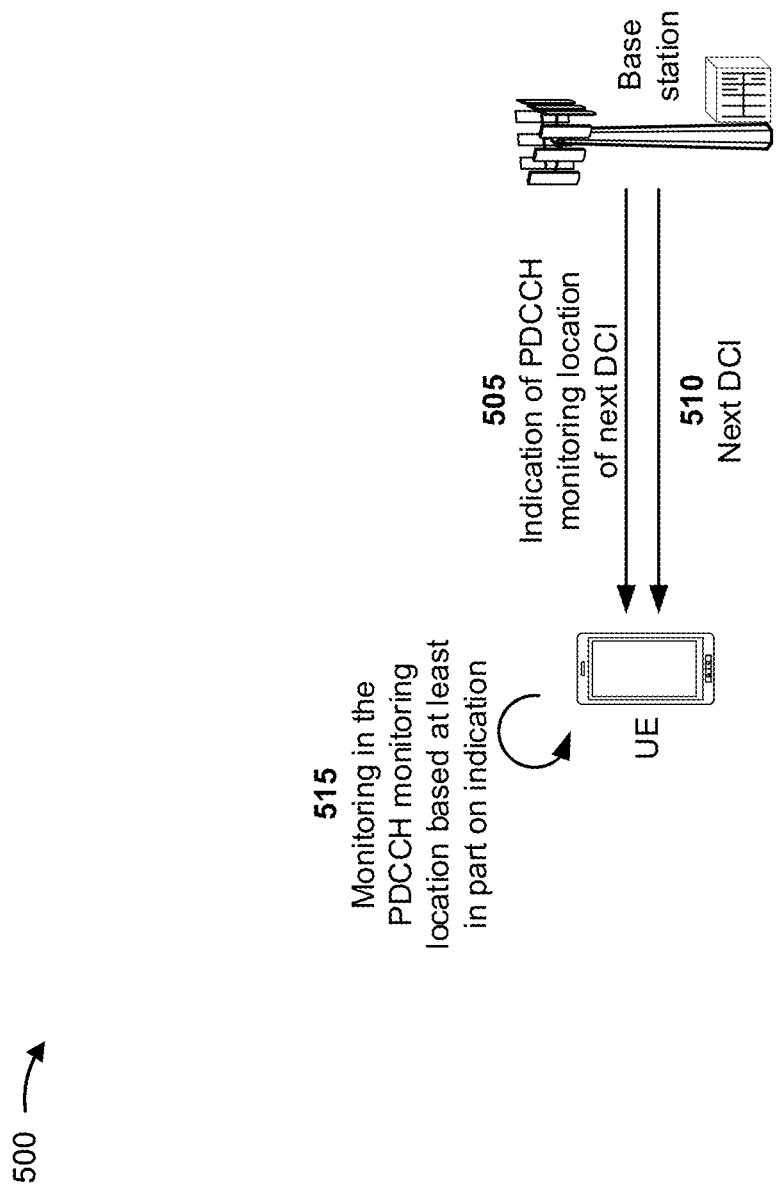
FIGS. 5A-5C are diagrams illustrating examples of dynamic indication of a PDCCH monitoring location, in accordance with various aspects of the present disclosure.
Figure 5B:
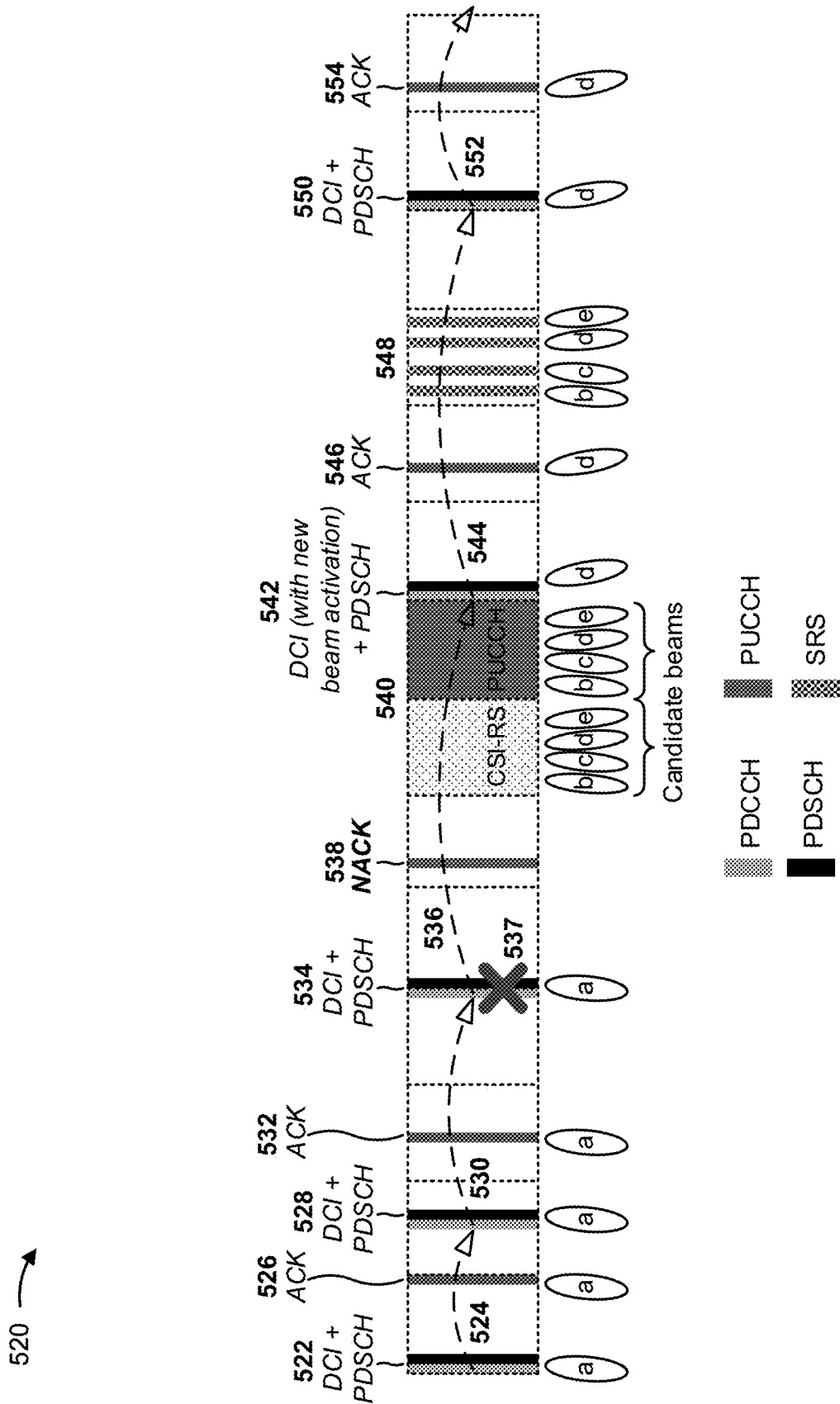
Figure 5C:
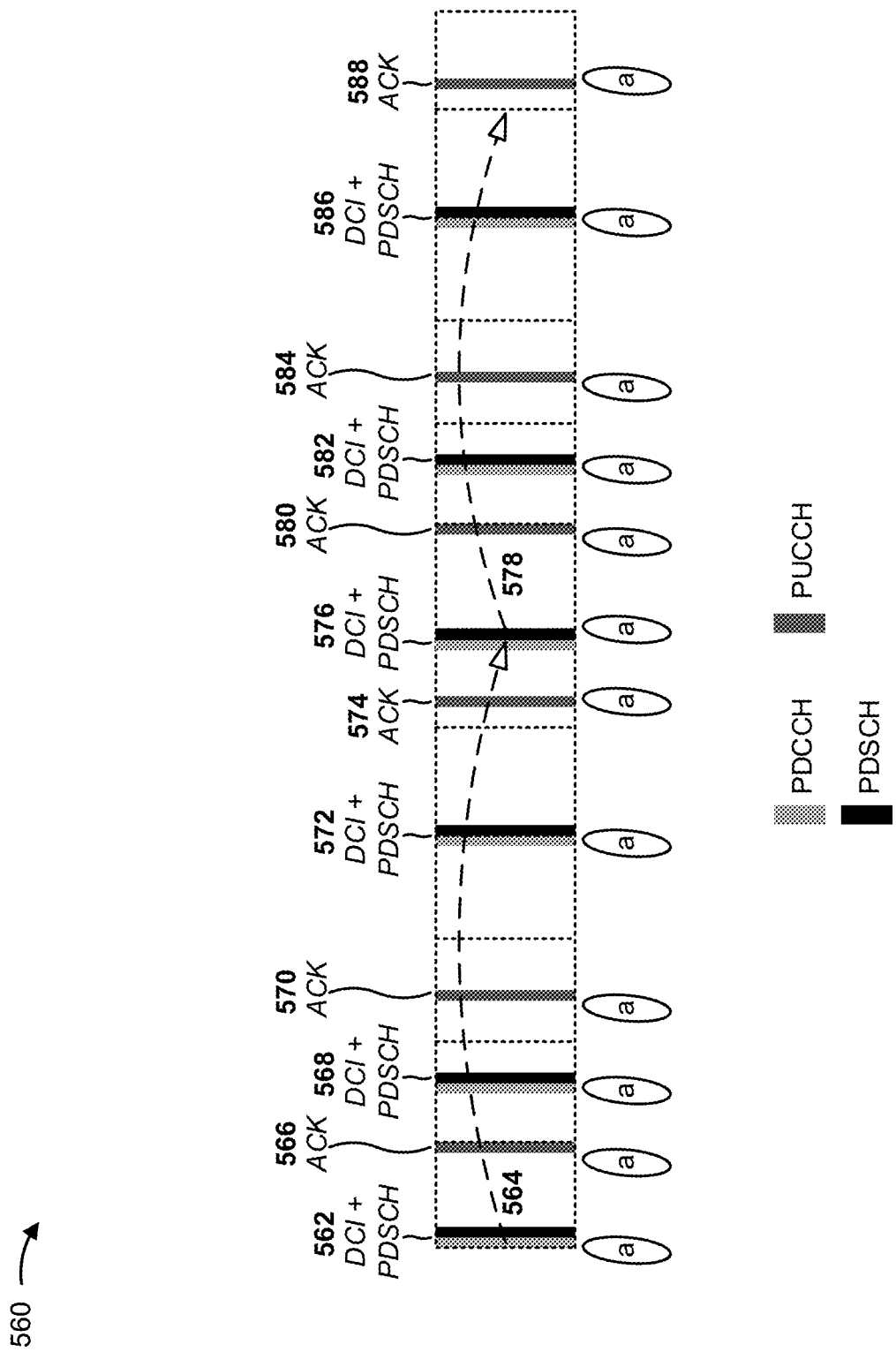

FIGS. 5A, 5B, and 5C are diagrams illustrating examples 500, 520, and 560, respectively, of dynamic indication of a PDCCH monitoring location, in accordance with various aspects of the present disclosure.

As shown in FIG. 5A by reference 505, a base station (e.g., base station 110) may transmit, to a UE (e.g., UE 120), an indication identifying a PDCCH monitoring location associated with a next DCI communication. In other words, the base station may transmit an indication identifying a PDCCH monitoring location to be monitored by the UE in association with receiving a next DCI communication. In some aspects, the indication is valid at least until the PDCCH monitoring location, irrespective of an amount of time between a time of the indication and a time of the PDCCH monitoring location. In other words, validity of the indicated PDCCH monitoring location is not defined by a particular period of time (i.e., the indicated PDCCH monitoring location does not expire after a particular period of time). Rather, the indication may be valid at least until a next occurrence of the PDCCH monitoring location.

In some aspects, the indication identifying the PDCCH monitoring location may include one or more parameters that define the PDCCH monitoring location. For example, the indication may include information that identifies a location of the PDCCH monitoring in the frequency domain and/or information that identifies a location of the PDCCH monitoring location in the time domain. As another example, the indication may include information that identifies a search space within which the PDCCH monitoring location is located. As another example, the indication may include information that identifies a CORESET within which the PDCCH monitoring location is located. As another example, the indication may include information that identifies a periodicity and/or an offset that defines the PDCCH monitoring location. As another example, the indication may include information that identifies a duration of the PDCCH monitoring location. As another example, the indication may include information that identifies a number of symbols associated with the PDCCH monitoring location (e.g., a number of symbols to be monitored). As another example, the indication may include information that identifies a number of PDCCH candidates.

In some aspects, the indication identifying the PDCCH monitoring location may be associated with at least one subsequent DCI communication after the next DCI communication. That is, in some aspects, the indication may identify multiple PDCCH monitoring locations, each associated with a respective one of multiple next DCI communications. Put generally, the indication may identify N (N≥1) PDCCH monitoring locations, each associated with a respective one of a next N DCI communications.

In some aspects, the base station may transmit the indication in a DCI communication (e.g., in a DCI communication transmitted in a previously indicated PDCCH monitoring location). In some aspects, the base station may transmit the indication via radio resource control (RRC) signaling. In some aspects, the base station may transmit the indication in a medium access control (MAC) control element (CE). In such a case, the MAC CE may identify a single logical channel identifier and a single PDCCH monitoring location, or may identify a plurality of logical channel identifiers and a corresponding plurality of PDCCH monitoring locations.

As further indicated by reference 505, the UE may receive the indication identifying the PDCCH monitoring location. Example operations in a scenario in which the UE receives the indication are described below, followed by example operations in a scenario in which the UE does not receive the indication.

In some aspects, the UE may receive the indication in a DCI communication, via RRC signaling, or in a MAC CE, as indicated above.

In some aspects, the UE may transmit an acknowledgment (ACK) indicating that the indication was received. As an example, if the indication is carried in a DCI communication, and the DCI communication is transmitted along with a PDSCH communication, the UE may attempt to decode the DCI communication and the PDSCH communication. Here, if the UE successfully decodes the DCI communication and the PDSCH communication, then the UE may transmit (e.g., in a PUCCH) an ACK indicating that the UE has received the indication and the PDSCH communication. Conversely, in some aspects, the UE may transmit a negative ACK (NACK) indicating that the indication was received. As an example, if the indication is carried in a DCI communication, and the DCI communication is transmitted along with a PDSCH communication, the UE may attempt to decode the DCI communication and the PDSCH communication. Here, if the UE successfully decodes the DCI communication but does not successfully decode the PDSCH communication, then the UE may transmit (e.g., in a PUCCH) a NACK indicating that the UE has received the indication, but not the PDSCH communication. Therefore, in some aspects, the base station may receive an ACK or a NACK indicating that the indication was received by the UE.

As shown by reference 510, the base station may transmit the next DCI communication after transmitting the indication. In some aspects, the base station may transmit the next DCI communication in the indicated PDCCH monitoring location. For example, as described above, the UE may receive the indication and may transmit, to the base station, an ACK or a NACK indicating that the UE received the indication. Here, the base station may transmit the next DCI communication in the PDCCH monitoring location based at least in part on the ACK or the NACK indicating that the indication was received.

As shown by reference 515, in some aspects, the UE may monitor in the PDCCH monitoring location based at least in part on the indication. For example, after receiving the indication, the UE may monitor in the identified PDCCH monitoring location in association with receiving the next DCI communication.

In some aspects, the UE may receive the next DCI communication based at least in part on monitoring in the PDCCH monitoring location. In some aspects, the next DCI communication may include another indication identifying another PDCCH monitoring location associated with transmitting a subsequent DCI communication. That is, the base station may indicate another PDCCH monitoring location associated with a subsequent DCI communication to be received by the UE (e.g., a DCI communication that is to follow the previously transmitted/received next DCI communication). Here, the UE may monitor in the other PDCCH monitoring location based at least in part on the other indication. In this way, indication of PDCCH monitoring locations may be repeated over time, which allows PDCCH monitoring locations to be dynamically indicated to the UE, thereby providing flexibility in terms of PDCCH monitoring locations, while also reducing power consumption at the UE.

In some aspects, the UE may transmit an ACK or a NACK indicating that the next DCI communication was received. As an example, the next DCI communication may be transmitted along with a PDSCH communication, the UE may attempt to decode the next DCI communication and the PDSCH communication. Here, if the UE successfully decodes the next DCI communication and the PDSCH communication, then the UE may transmit (e.g., in a PUCCH) an ACK indicating that the UE has received the next DCI communication and the PDSCH communication. Conversely, if the UE successfully decodes the next DCI communication but does not successfully decode the PDSCH communication, then the UE may transmit (e.g., in a PUCCH) a NACK indicating that the UE has received the next DCI communication, but not the PDSCH communication. Therefore, in some aspects, the base station may receive an ACK or a NACK indicating that the next DCI communication was received by the UE.

In some aspects, the UE may fail to receive the next DCI communication based at least in part on monitoring in the PDCCH monitoring location, and may transmit a NACK indicating that the next DCI communication was not received. For example, if the UE does not successfully decode the next DCI communication, then the UE may transmit (e.g., in a PUCCH) a NACK indicating that the UE has failed to receive the next DCI communication. Therefore, in some aspects, the base station may receive a NACK indicating that the next DCI communication was not received by the UE.

In some aspects, based at least in part on failing to receive the next DCI communication, the UE may monitor in the PDCCH monitoring location in association with receiving a subsequent DCI communication (e.g., a DCI communication that follows the next DCI communication). For example, upon failing to receive the next DCI communication, the UE may transmit a NACK indicating that the next DCI communication was not received. Here, the UE may be configured to monitor in the previously indicated PDCCH monitoring location (e.g., the same PDCCH monitoring location as that monitored for the next DCI communication that was not received by the UE). In some aspects, the base station may be configured to transmit the subsequent DCI communication in the PDCCH monitoring location based at least in part on receiving the NACK indicating that the next DCI communication was not received. Put another way, in some aspects, when the UE does not receive the next DCI communication, the previously indicated PDCCH monitoring location may be reused for a subsequent DCI communication.

In some aspects, based at least in part on failing to receive the next DCI communication, the UE may monitor a plurality of PDCCH monitoring locations in association with receiving a subsequent DCI communication (e.g., a DCI communication that follows the next DCI communication). For example, upon failing to receive the next DCI communication, the UE may transmit a NACK indicating that the next DCI communication was not received. Here, the UE may be configured to monitor a plurality of PDCCH monitoring locations (e.g., a plurality of PDCCH monitoring locations, configured for the UE, that are candidates for carrying a PDCCH for the UE). In some aspects, the base station may be configured to transmit the subsequent DCI communication in one of the plurality of PDCCH monitoring locations based at least in part on receiving the NACK indicating that the next DCI communication was not received.

In some aspects, the base station may receive no indication of whether the next DCI communication was received. This may be the case when, for example, the UE does not transmit an ACK or a NACK, or when an ACK or NACK transmitted by the UE is not received by the base station (e.g., due to a beam quality issue). In some aspects, the base station may be configured to transmit the subsequent DCI communication in the PDCCH monitoring location based at least in part on receiving no indication of whether the next DCI communication was received. Put another way, in some aspects, when the base station does not receive any indication of whether the UE has received the next DCI communication, the previously indicated PDCCH monitoring location may be reused for a subsequent DCI communication. Alternatively, the base station may be configured to transmit the subsequent DCI in one of a plurality of PDCCH monitoring locations based at least in part on receiving no indication of whether the next DCI communication was received.

FIG. 5B illustrates a diagram of an example sequence of operations associated with dynamic indications of PDCCH monitoring locations.

As indicated by reference 522, a base station transmits, to a UE and using a first beam (identified in FIG. 5B as "a"), a first DCI communication and a first PDSCH communication. As indicated by reference 524, the first DCI communication includes an indication of a PDCCH monitoring location associated with a second DCI communication (i.e., a next DCI communication associated with the UE). As indicated by reference 526, the UE receives the first DCI communication and the first PDSCH communication, and transmits, to the base station, an ACK indicating that the first DCI communication and the first PDSCH communication were received by the UE.

As indicated by reference 528, the base station transmits, to the UE and using the first beam, the second DCI communication and a second PDSCH communication. Here, the base station transmits the second DCI communication in the PDCCH monitoring location indicated by the first DCI communication. The UE monitors the PDCCH monitoring location indicated by the first DCI communication, and receives the second DCI communication accordingly. As indicated by reference 530, the second DCI communication includes an indication of a PDCCH monitoring location associated with a third DCI communication (i.e., a next DCI communication associated with the UE). Here, the UE also receives the second PDSCH communication. Next, as shown by reference 532, the UE transmits, to the base station, an ACK indicating that the second DCI communication and the second PDSCH communication were received by the UE.

As indicated by reference 534, the base station transmits, to the UE and using the first beam, the third DCI communication and a third PDSCH communication. Here, the base station transmits the third communication in the PDCCH monitoring location indicated by the second DCI communication. The UE monitors the PDCCH monitoring location indicated by the second DCI communication, and receives the second DCI communication accordingly. As indicated by reference 536, the third DCI communication includes an indication of a PDCCH monitoring location associated with a fourth DCI communication (i.e., a next DCI communication associated with the UE). However, in this example, as indicated by reference 537, while the UE receives the third DCI communication, the UE does not receive (e.g., fails to decode) the third PDSCH communication. In this example, the failure to receive the third PDSCH is caused by a beam quality issue. Therefore, as indicated by reference 538, the UE transmits, to the base station, a NACK indicating that the third DCI communication was received and that the third PDSCH communication was not received due to the beam quality issue.

As shown by reference 540, based at least in part on the NACK, the base station and the UE perform a beam re-selection procedure. For example, the base station transmits channel state information reference signals (CSI-RSs) on a set of beams (e.g., including a second beam identified as "b", a third beam identified as "c", a fourth beam identified as "d", and a fifth beam identified as "e"). The UE receives the CSI-RSs and provides PUCCH communications, associated with each beam of the set of beams, in association with identifying a suitable beam to be used for further communications with the base station. In this example, the fourth beam is selected as a suitable beam.

After the beam re-selection, as indicated by reference 542, the base station transmits, to the UE and using the fourth beam, the fourth DCI communication and a fourth PDSCH communication (e.g., a retransmission of the third PDSCH). Here, the base station transmits the fourth DCI communication in the PDCCH monitoring location indicated by the third DCI communication. The UE monitors the PDCCH monitoring location indicated by the third DCI communication, and receives the fourth DCI communication accordingly. As indicated by reference 544, the fourth DCI communication includes an indication of a PDCCH monitoring location associated with a fifth DCI communication (i.e., a next DCI communication associated with the UE). Notably, the indication of the PDCCH monitoring location included in the third DCI communication is still valid for receiving the fourth DCI communication, even though the beam re-selection procedure was performed between the NACK and the transmission of the fourth DCI communication. In other words, the indication in the third DCI communication is valid at least until the indicated PDCCH monitoring location irrespective of an amount of time (or performance of other operations) between the indication and the indicated PDCCH monitoring location. Here, the UE also receives the fourth PDSCH communication. Therefore, as shown by reference 546, the UE transmits, to the base station, an ACK indicating that the fourth DCI communication and the fourth PDSCH communication were received by the UE.

As shown by reference 548, after the UE transmits the ACK, the UE transmits sounding reference signals (SRSs) for the set of beams based on which beam re-selection was performed. As indicated by reference 550, after transmission of the SRSs, the base station transmits, to the UE and using the fourth beam, the fifth DCI communication and a fifth PDSCH communication. Here, the base station transmits the fifth DCI communication in the PDCCH monitoring location indicated by the fourth DCI communication. The UE monitors the PDCCH monitoring location indicated by the fourth DCI communication, and receives the fifth DCI communication accordingly. As indicated by reference 552, the fifth DCI communication includes an indication of a PDCCH monitoring location associated with a sixth DCI communication (i.e., a next DCI communication associated with the UE (not shown)). Notably, the indication of the PDCCH monitoring location included in the fourth DCI communication is still valid for receiving the fifth DCI communication, even though the UE transmitted the SRSs between the previous ACK and the base station transmission of the fifth DCI communication. In other words, the indication in the fourth DCI communication is valid at least until the indicated PDCCH monitoring location, irrespective of an amount of time (or performance of other operations) between the indication and the indicated PDCCH monitoring location. Here, the UE also receives the fifth PDSCH communication. Next, as shown by reference 554, the UE transmits, to the base station, an ACK indicating that the fifth DCI communication and the fifth PDSCH communication were received. Further operations of the base station and the UE may continue in a similar manner.

In some aspects, the indication identifying the PDCCH monitoring location may be valid for a particular period of time. For example, the indication identifying the PDCCH monitoring location may be valid for a particular number of slots, a particular number of milliseconds, or the like. In such a case, the PDCCH monitoring location identified by the indication may be the same for all DCI communications arriving with the particular period of time.

FIG. 5C illustrates a diagram of another example sequence of operations associated with dynamic indications of PDCCH monitoring locations.

As indicated by reference 562, a base station transmits, to a UE and using a first beam (identified in FIG. 5C as "a"), a first DCI communication and a first PDSCH communication. As indicated by reference 564, the first DCI communication includes an indication of a PDCCH monitoring location. Here, as indicated by the dashed arrow associated with reference 564, the PDCCH monitoring location is valid for a particular period of time—six slots. That is, in the next six slots, the PDCCH monitoring location identified in the indication is to be used by the UE in association with receiving DCI communications. As indicated by reference 566, the UE receives the first DCI communication and the first PDSCH communication, and transmits, to the base station, an ACK indicating that the first DCI communication and the first PDSCH communication were received by the UE.

As indicated by reference 568, the base station transmits, to the UE and using the first beam, a second DCI communication and a second PDSCH communication. Here, the base station transmits the second DCI communication in the PDCCH monitoring location indicated by the first DCI communication (e.g., the indication is still valid since the second DCI communication is being transmitted in a second slot since the indication). The UE monitors the PDCCH monitoring location indicated by the first DCI communication, and receives the second DCI communication and the second PDSCH communication accordingly. Next, as shown by reference 570, the UE transmits, to the base station, an ACK indicating that the second DCI communication and the second PDSCH communication were received by the UE.

As indicated by reference 572, the base station transmits, to the UE and using the first beam, a third DCI communication and a third PDSCH communication. Here, the base station transmits the third DCI communication in the PDCCH monitoring location indicated by the first DCI communication (e.g., the indication is still valid since the third DCI communication is being transmitted in a fifth slot since the indication). The UE monitors the PDCCH monitoring location indicated by the first DCI communication, and receives the third DCI communication and the third PDSCH communication accordingly. Next, as shown by reference 574, the UE transmits, to the base station, an ACK indicating that the third DCI communication and the third PDSCH communication were received by the UE.

As indicated by reference 576, the base station transmits, to the UE and using the first beam, a fourth DCI communication and a fourth PDSCH communication. Here, the base station transmits the fourth DCI communication in the PDCCH monitoring location indicated by the first DCI communication (e.g., the indication is still valid since the fourth DCI communication is being transmitted in a sixth slot since the indication). As indicated by reference 578, the fourth DCI communication includes an indication of another PDCCH monitoring location. Here, as indicated by the dashed arrow associated with reference 578, the PDCCH monitoring location is valid for a next five slots. That is, in the next five slots, the PDCCH monitoring location identified in the other indication is to be used by the UE in association with receiving DCI communications. As indicated by reference 580, the UE receives the fourth DCI communication and the fourth PDSCH communication, and transmits, to the base station, an ACK indicating that the fourth DCI communication and the fourth PDSCH communication were received by the UE.

As indicated by reference 582, the base station transmits, to the UE and using the first beam, a fifth DCI communication and a fifth PDSCH communication. Here, the base station transmits the fifth DCI communication in the PDCCH monitoring location indicated by the fourth DCI communication (e.g., the indication is still valid since the fourth DCI communication is being transmitted in a second slot since the indication). The UE monitors the PDCCH monitoring location indicated by the fourth DCI communication, and receives the fifth DCI communication and the fifth PDSCH communication accordingly. Next, as shown by reference 584, the UE transmits, to the base station, an ACK indicating that the fifth DCI communication and the fifth PDSCH communication were received by the UE.

As indicated by reference 586, the base station transmits, to the UE and using the first beam, a sixth DCI communication and a sixth PDSCH communication. Here, the base station transmits the sixth DCI communication in the PDCCH monitoring location indicated by the fourth DCI communication (e.g., the indication is still valid since the sixth DCI communication is being transmitted in a fourth slot since the indication). The UE monitors the PDCCH monitoring location indicated by the fourth DCI communication, and receives the sixth DCI communication and the sixth PDSCH communication accordingly. Next, as shown by reference 588, the UE transmits, to the base station, an ACK indicating that the sixth DCI communication and the sixth PDSCH communication were received by the UE.

As indicated above, FIGS. 5A-5C are provided as examples. Other examples may differ from what is described with respect to FIGS. 5A-5C.

Figure 6:
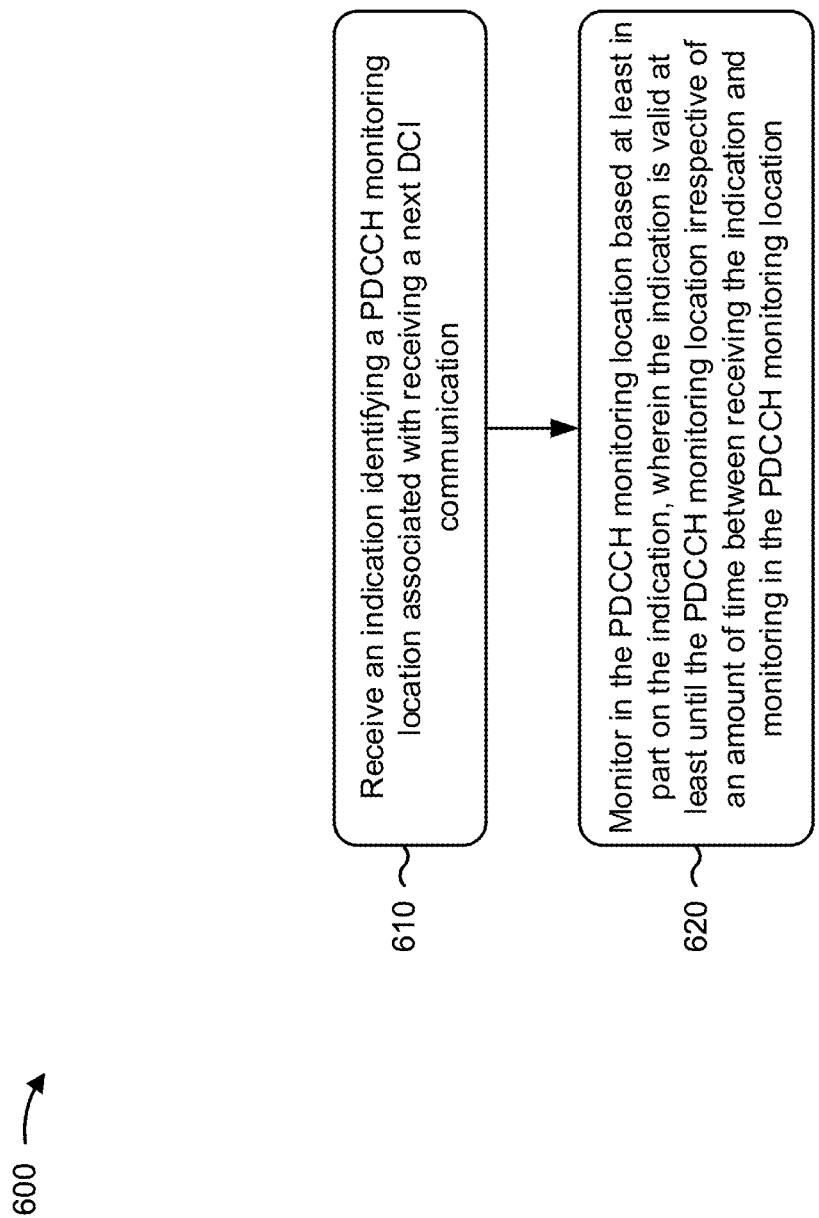
FIG. 6 is a diagram illustrating an example process performed, for example, by a user equipment, in accordance with various aspects of the present disclosure.

FIG. 6 is a diagram illustrating an example process 600 performed, for example, by UE, in accordance with various aspects of the present disclosure. Example process 600 is an example where the UE (e.g., UE 120 and/or the like) performs operations associated with dynamic indication of a PDCCH monitoring location.

As shown in FIG. 6, in some aspects, process 600 may include receiving an indication identifying a PDCCH monitoring location associated with receiving a next DCI communication (block 610). For example, the UE (e.g., using receive processor 258, controller/processor 280, memory 282, and/or the like) may receive an indication identifying a PDCCH monitoring location associated with receiving a next DCI communication, as described above.

As further shown in FIG. 6, in some aspects, process 600 may include monitoring in the PDCCH monitoring location based at least in part on the indication, wherein the indication is valid at least until the PDCCH monitoring location irrespective of an amount of time between receiving the indication and monitoring in the PDCCH monitoring location (block 620). For example, the UE (e.g., using receive processor 258, controller/processor 280, memory 282, and/or the like) may monitor in the PDCCH monitoring location based at least in part on the indication, as described above. In some aspects, the indication is valid at least until the PDCCH monitoring location irrespective of an amount of time between receiving the indication and monitoring in the PDCCH monitoring location.

Process 600 may include additional aspects, such as any single aspect or any combination of aspects described below and/or in connection with one or more other processes described elsewhere herein.

In a first aspect, the indication identifying the PDCCH monitoring location includes information associated with at least one of a frequency domain location, a time domain location, a search space identifier, a CORESET identifier, a periodicity, an offset, a duration, a number of symbols to be monitored, or a number of PDCCH candidates.

In a second aspect, alone or in combination with the first aspect, the indication identifying the PDCCH monitoring location is further associated with receiving at least one subsequent DCI communication after the next DCI communication.

In a third aspect, alone or in combination with one or more of the first and second aspects, the indication is received in DCI.

In a fourth aspect, alone or in combination with one or more of the first through third aspects, the indication is received via RRC signaling.

In a fifth aspect, alone or in combination with one or more of the first through fourth aspects, the indication is received in a MAC CE.

In a sixth aspect, in combination with the fifth aspect, the MAC CE identifies a single logical channel identifier and a single PDCCH monitoring location.

In a seventh aspect, in combination with the fifth aspect, the MAC CE identifies a plurality of logical channel identifiers and a corresponding plurality of PDCCH monitoring locations.

In an eighth aspect, alone or in combination with one or more of the first through seventh aspects, process 600 includes transmitting an ACK or a NACK indicating that the indication was received.

In a ninth aspect, alone or in combination with one or more of the first through eighth aspects, process 600 includes receiving the next DCI communication based at least in part on monitoring in the PDCCH monitoring location, wherein the next DCI communication includes another indication identifying another PDCCH monitoring location associated with receiving a subsequent DCI communication; and monitoring in the other PDCCH monitoring location based at least in part on the other indication.

In a tenth aspect, alone or in combination with one or more of the first through ninth aspects, process 600 includes receiving the next DCI communication based at least in part on monitoring in the PDCCH monitoring location; and transmitting an ACK or a NACK indicating that the next DCI communication was received.

In an eleventh aspect, alone or in combination with one or more of the first through tenth aspects, process 600 includes failing to receive the next DCI communication based at least in part on monitoring in the PDCCH monitoring location; and transmitting a NACK indicating that the next DCI communication was not received.

In a twelfth aspect, in combination with the eleventh aspect, process 600 includes monitoring in the PDCCH monitoring location in association with receiving a subsequent DCI communication based at least in part on failing to receive the next DCI communication.

In a thirteenth aspect, alone or in combination with one or more of the eleventh and twelfth aspects, process 600 includes monitoring in a plurality of PDCCH monitoring locations in association with receiving a subsequent DCI communication based at least in part on failing to receive the next DCI communication.

In a fourteenth aspect, alone or in combination with one or more of the first through thirteenth aspects the indication identifying the PDCCH monitoring location is valid for a particular period of time.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
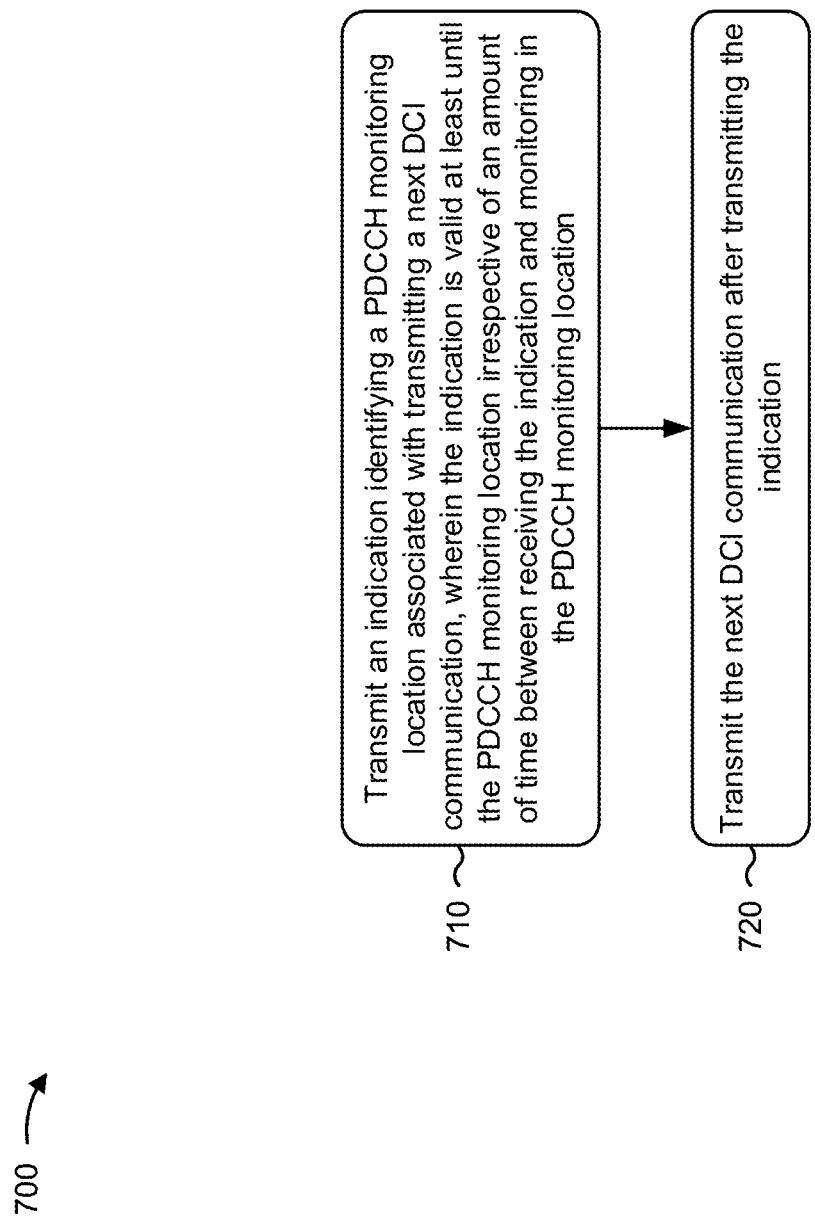
FIG. 7 is a diagram illustrating an example process performed, for example, by a base station, in accordance with various aspects of the present disclosure.

FIG. 7 is a diagram illustrating an example process 700 performed, for example, by a base station, in accordance with various aspects of the present disclosure. Example process 700 is an example where the base station (e.g., base station 110 and/or the like) performs operations associated with dynamic indication of a PDCCH monitoring location.

As shown in FIG. 7, in some aspects, process 700 may include transmitting an indication identifying a PDCCH monitoring location associated with transmitting a next DCI communication, wherein the indication is valid at least until the PDCCH monitoring location irrespective of an amount of time between receiving the indication and monitoring in the PDCCH monitoring location (block 710). For example, the base station (e.g., using transmit processor 220, controller/processor 240, memory 242, and/or the like) may transmit an indication identifying a PDCCH monitoring location associated with transmitting a next DCI communication, as described above. In some aspects, the indication is valid at least until the PDCCH monitoring location irrespective of an amount of time between receiving the indication and monitoring in the PDCCH monitoring location.

As further shown in FIG. 7, in some aspects, process 700 may include transmitting the next DCI communication after transmitting the indication (block 720). For example, the base station (e.g., using transmit processor 220, controller/processor 240, memory 242, and/or the like) may transmit the next DCI communication after transmitting the indication, as described above.

Process 700 may include additional aspects, such as any single aspect or any combination of aspects described below and/or in connection with one or more other processes described elsewhere herein.

In a first aspect, the indication identifying the PDCCH monitoring location includes information that identifies at least one of a frequency domain location, a time domain location, a search space identifier, a CORESET identifier, a periodicity, an offset, a duration, a number of symbols to be monitored, or a number of PDCCH candidates.

In a second aspect, alone or in combination with the first aspect, the indication identifying the PDCCH monitoring location is further associated with transmitting at least one subsequent DCI communication after the next DCI communication.

In a third aspect, alone or in combination with one or more of the first and second aspects, the indication is transmitted in DCI.

In a fourth aspect, alone or in combination with one or more of the first through third aspects, the indication is transmitted via RRC signaling.

In a fifth aspect, alone or in combination with one or more of the first through fourth aspects, the indication is transmitted in a MAC CE.

In a sixth aspect, in combination with the fifth aspect, the MAC CE identifies a single logical channel identifier and a single PDCCH monitoring location.

In a seventh aspect, in combination with the fifth aspect, the MAC CE identifies a plurality of logical channel identifiers and a corresponding plurality of PDCCH monitoring locations.

In an eighth aspect, alone or in combination with one or more of the first through seventh aspects, process 700 includes receiving an ACK or a NACK indicating that the indication was received.

In a ninth aspect, in combination with the eighth aspect, the next DCI communication is transmitted in the PDCCH monitoring location based at least in part on the ACK or the NACK indicating that the indication was received.

In a tenth aspect, alone or in combination with one or more of the first through ninth aspects, the next DCI communication includes another indication identifying another PDCCH monitoring location associated with transmitting a subsequent DCI communication.

In an eleventh aspect, alone or in combination with one or more of the first through tenth aspects, process 700 includes receiving an ACK or a NACK indicating that the next DCI communication was received.

In a twelfth aspect, alone or in combination with one or more of the first through eleventh aspects, process 700 includes receiving a NACK indicating that the next DCI communication was not received.

In a thirteenth aspect, in combination with the twelfth aspect, process 700 includes transmitting a subsequent DCI communication in the PDCCH monitoring location based at least in part on the NACK.

In a fourteenth aspect, in combination with the twelfth aspect, process 700 includes transmitting a subsequent DCI communication in one of a plurality of PDCCH monitoring locations based at least in part on the NACK.

In a fifteenth aspect, alone or in combination with one or more of the first through fourteenth aspects, process 700 includes receiving no indication of whether the next DCI communication was received; and transmitting a subsequent DCI in the PDCCH monitoring location based at least in part on receiving no indication of whether the next DCI communication was received.

In a sixteenth aspect, alone or in combination with one or more of the first through fifteenth aspects, process 700 includes receiving no indication of whether the next DCI communication was received; and transmitting a subsequent DCI in one of a plurality of PDCCH monitoring locations based at least in part on receiving no indication of whether the next DCI communication was received.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8A:
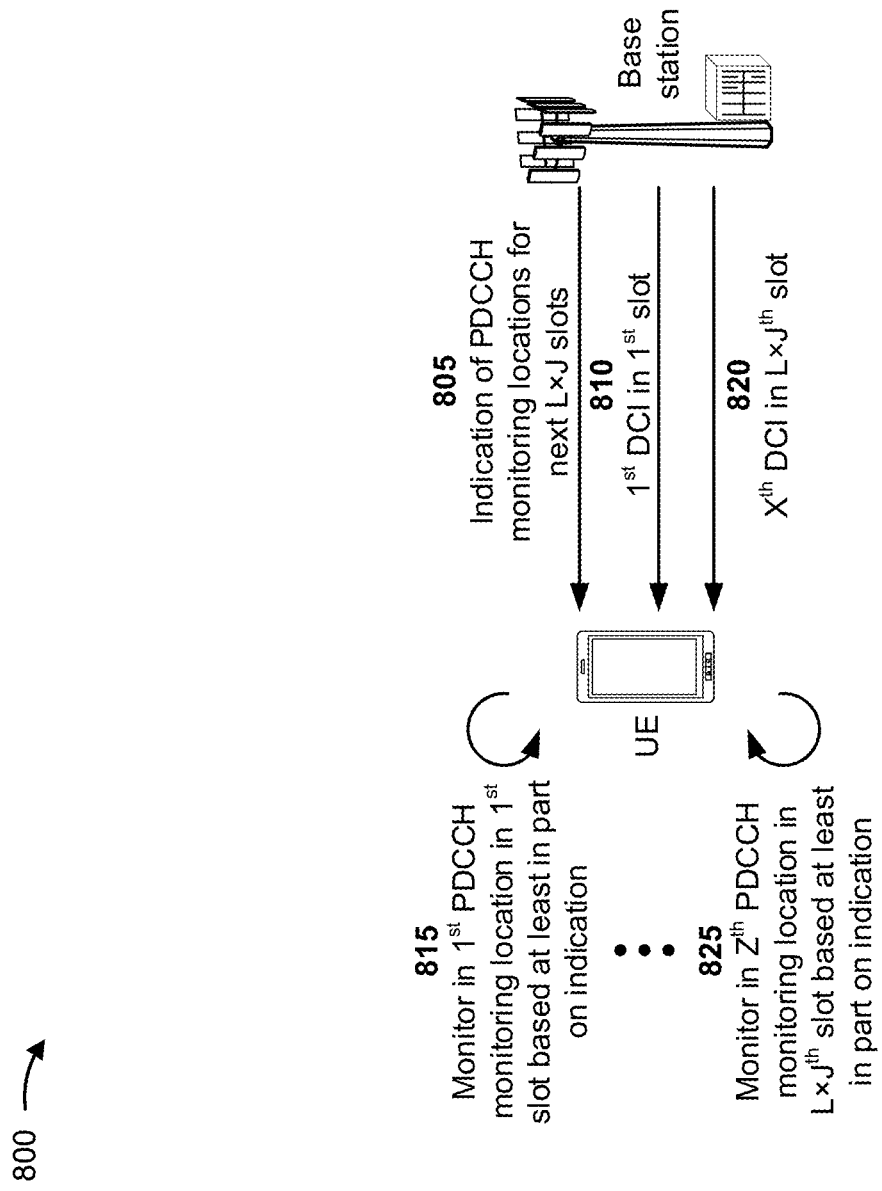
FIGS. 8A and 8B are diagrams illustrating examples of dynamic indication of a PDCCH monitoring location, in accordance with various aspects of the present disclosure.
Figure 8B:
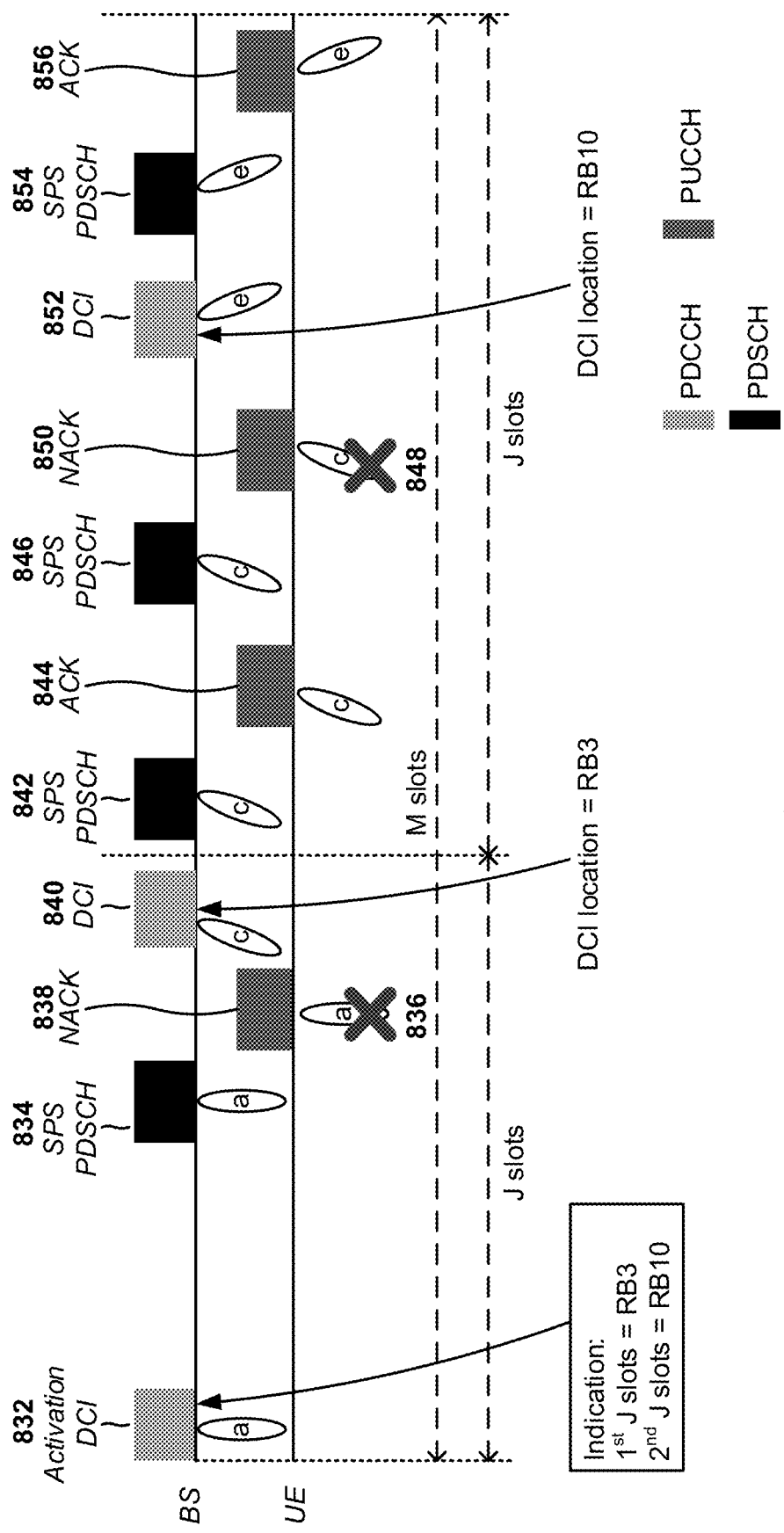

FIGS. 8A and 8B are diagrams illustrating examples 800 and 830, respectively, of dynamic indication of a PDCCH monitoring location, in accordance with various aspects of the present disclosure.

As shown in FIG. 8A by reference 805, a base station (e.g., base station 110) may transmit, to a UE (e.g., UE 120), an indication identifying PDCCH monitoring locations for an upcoming group of periods of time. For example, the indication may identify a first PDCCH monitoring location associated with DCI communications to be transmitted during a first period of time, and a second PDCCH monitoring location associated with DCI communications to be transmitted during a second period of time that follows the first period of time. As a particular example, the indication may identify a first PDCCH monitoring location associated with DCI communications to be transmitted/received during a first set of J (J≥1) slots, a second PDCCH monitoring location associated with DCI communications to be transmitted/received during a second set of J slots, and so on. In other words, the base station may transmit an indication identifying PDCCH monitoring locations to be monitored by the UE in association with receiving DCI communications in each period of time of a group of upcoming periods of time.

In some aspects, for a given PDCCH monitoring location, the indication may include one or more parameters that define the PDCCH monitoring location. For example, the indication may include information that identifies a location of the PDCCH monitoring location in the frequency domain and/or information that identifies a location of the PDCCH monitoring location in the time domain. As another example, the indication may include information that identifies a search space within which the PDCCH monitoring location is located. As another example, the indication may include information that identifies a CORESET within which the PDCCH monitoring location is located. As another example, the indication may include information that identifies a periodicity and/or an offset that defines the PDCCH monitoring location. As another example, the indication may include information that identifies a duration of the PDCCH monitoring location. As another example, the indication may include information that identifies a number of symbols associated with the PDCCH monitoring location (e.g., a number of symbols to be monitored). As another example, the indication may include information that identifies a number of PDCCH candidates.

In some aspects, two or more PDCCH monitoring locations identified by the indication may differ among periods of time associated with the indication. For example, a first PDCCH monitoring location associated with receiving DCI communications during a first period of time may be different from a second PDCCH monitoring location associated with receiving DCI communications during a second period of time. In some aspects, two or more PDCCH monitoring locations identified by the indication may be the same across periods of time. Continuing the above example, a third PDCCH monitoring location associated with receiving DCI communications during a third period of time (e.g., a period of time following the second period of time) may the same as the first PDCCH monitoring location associated with receiving DCI communications during the first period of time.

In some aspects, the indication may identify a number of periods of time during which the indication is valid (denoted as L, where L≥1), and a number of slots in each period of time (denoted as J). In such a case, the total period of time during which the indication is valid (denoted as M, where M≥1) is a product of the number of periods of time during which the indication is valid and the number of slots in each period of time (M=L×J). Alternatively, in some aspects, the indication may identify the total period of time during which the indication is valid (M). For example, the indication may identify the number of slots in each period of time (J) and the total number of slots during which the indication is valid. In some aspects, the indication may identify a PDCCH monitoring location associated with each set of J slots, thereby enabling the PDCCH monitoring location to be varied among the periods of time during which the indication is valid. In some aspects, the variation of PDCCH monitoring locations among the sets of slots improves flexibility in association with receiving and transmitting DCI communications.

In some aspects, the base station may transmit the indication in a DCI communication (e.g., in a DCI communication transmitted in a previously indicated PDCCH monitoring location). In some aspects, the base station may transmit the indication via RRC signaling. In some aspects, the base station may transmit the indication in a MAC CE. In such a case, the MAC CE may identify a single logical channel identifier and a single PDCCH monitoring location, or may identify a plurality of logical channel identifiers and a corresponding plurality of PDCCH monitoring locations.

As further indicated by reference 805, the UE may receive the indication identifying PDCCH monitoring locations for an upcoming group of periods of time. In some aspects, the UE may receive the indication in a DCI communication, via RRC signaling, or in a MAC CE, as indicated above.

In some aspects, the UE may transmit an ACK indicating that the indication was received. As an example, if the indication is carried in a DCI communication, and the DCI communication is transmitted along with a PDSCH communication, the UE may attempt to decode the DCI communication and the PDSCH communication. Here, if the UE successfully decodes the DCI communication and the PDSCH communication, then the UE may transmit (e.g., in a PUCCH) an ACK indicating that the UE has received the indication and the PDSCH communication. Conversely, in some aspects, the UE may transmit a NACK indicating that the indication was received. As an example, if the indication is carried in a DCI communication, and the DCI communication is transmitted along with a PDSCH communication, the UE may attempt to decode the DCI communication and the PDSCH communication. Here, if the UE successfully decodes the DCI communication but does not successfully decode the PDSCH communication, then the UE may transmit (e.g., in a PUCCH) a NACK indicating that the UE has received the indication, but not the PDSCH communication. Therefore, in some aspects, the base station may receive an ACK or a NACK indicating that the indication was received by the UE.

As shown by reference 810, the base station may transmit a first DCI communication in the first PDCCH monitoring location. For example, if the base station is to transmit a DCI communication during a first period of time (e.g., a first slot in a set of J slots), then the base station may transmit a first DCI communication in a first PDCCH monitoring location that corresponds to the first period of time. As shown by reference 815, in some aspects, the UE may monitor in the first PDCCH monitoring location based at least in part on the indication. For example, after receiving the indication, the UE may monitor in the identified first PDCCH monitoring location in association with receiving the first DCI communication.

The above-described operations can be repeated for transmittal and receipt of subsequent DCI communications. For example, as shown by reference 820, if the base station is to transmit a DCI communication (denoted as an $X^{th}$ DCI communication) to the UE during an $(L\times J)^{th}$ slot (i.e., a last slot during which the indication is valid), then the base station may transmit the $X^{th}$ DCI communication in a $Z^{th}$ PDCCH monitoring location (e.g., a PDCCH monitoring location indicated for a set of slots including the $(L\times J)^{th}$ slot). As shown by reference 825, in some aspects, the UE may monitor in the $Z^{th}$ PDCCH monitoring location based at least in part on the indication. For example, after receiving the indication, the UE may monitor in the identified $Z^{th}$ PDCCH monitoring location in association with receiving the $X^{th}$ DCI communication during the $(L\times J)^{th}$ slot.

In some aspects, a given DCI communication can be used to update and/or modify (e.g., in a manner described herein) the previously provided indication. In this way, indication of PDCCH monitoring locations may be dynamically indicated to the UE, thereby providing flexibility in terms of PDCCH monitoring locations, while also reducing power consumption at the UE.

In some aspects, the indication may identify multiple PDCCH monitoring locations for a given period of time. For example, in some aspects, the indication may identify a first PDCCH monitoring location associated with DCI communications during a first period of time, and a second PDCCH monitoring location associated with DCI communications during a second period of time. In this example, the indication may further include a third PDCCH monitoring location associated with receiving DCI communications during the first period of time, where the third PDCCH monitoring location is different from the first PDCCH monitoring location. Such a technique may be used when, for example, the first PDCCH monitoring location has been granted to another UE, but a DCI communication needs to be communicated to the UE during the first period of time. In such a case, the base station may determine that no DCI communication for the UE is to be transmitted in the first PDCCH monitoring location (e.g., since the first PDCCH monitoring location has been granted to the other UE), and may transmit the DCI communication in the third PDCCH monitoring location. From the UE perspective, the UE may determine that no DCI communication for the UE is received in the first PDCCH monitoring location (e.g., based at least in part on failing to decode a DCI communication in the first PDCCH monitoring location), and may monitor in the third PDCCH monitoring location based at least in part on determining that no DCI communication for the UE is received in the first PDCCH monitoring location. In some aspects, the UE may monitor in the first PDCCH monitoring location first (e.g., before monitoring in the third PDCCH monitoring location) based at least in part on priorities associated with the first and third PDCCH monitoring locations. In some aspects, the indication may identify more than two PDCCH monitoring locations associated with a given period of time.

FIG. 8B illustrates a diagram of an example sequence of operations associated with dynamic indications of PDCCH monitoring locations.

As indicated by reference 832, a base station transmits, to a UE and using a first beam (identified in FIG. 8B as "a"), a first DCI communication (e.g., an activation DCI) associated with activating an SPS/configured grant for the UE. As indicated, the first DCI communication includes an indication of a first PDCCH monitoring location (e.g., resource block (RB) 3) associated with a first set of J slots, and an indication of a second PDCCH monitoring location (e.g., RB10) associated with a second set of J slots (e.g., a set of J slots that immediately follows the first set of J slots).

As indicated by reference 834, the base station transmits, to the UE and using the first beam, a first SPS PDSCH communication. However, in this example, as indicated by reference 836, the UE does not receive (e.g., fails to decode) the first SPS PDSCH communication. In this example, the failure to receive the first SPS PDSCH communication is caused by a beam quality issue. Therefore, as indicated by reference 838, the UE transmits, to the base station, a NACK indicating that the first SPS PDSCH communication was not received due to the beam quality issue.

As shown by reference 840, based at least in part on the NACK, the base station selects a beam to be used for further communications with the UE. In this example, a third beam is selected (identified in FIG. 8B as "c"). Here, in association with the beam re-selection, the base station needs to transmit a second DCI communication to the UE. In this example, since the second DCI communication is to be transmitted within the first set of J slots, the base station transmits the second DCI communication in the first PDCCH monitoring location (e.g., RB3) identified by the indication previously provided by the base station. Because the UE expects to receive a DCI communication (e.g., as a result of the beam quality issue/beam re-selection) within the first set of J slots, the UE monitors the first PDCCH monitoring location (e.g., RB3) indicated by the first DCI communication, and receives the second DCI communication accordingly.

As indicated by reference 842, the base station next transmits, to the UE and using the third beam, a second SPS PDSCH communication (e.g., a re-transmission of the first SPS PDSCH communication). As shown by reference 844, the UE may receive the second SPS PDSCH communication, and may provide, to the base station, an ACK indicating that the second SPS PDSCH communication was received.

Next, as indicated by reference 846, the base station transmits, to the UE and using the third beam, a third SPS PDSCH communication. However, in this example, as indicated by reference 848, the UE does not receive (e.g., fails to decode) the third SPS PDSCH communication. In this example, the failure to receive the third SPS PDSCH communication is caused by a beam quality issue. Therefore, as indicated by reference 850, the UE transmits, to the base station, a NACK indicating that the third SPS PDSCH communication was not received due to the beam quality issue.

As shown by reference 852, based at least in part on the NACK, the base station selects a beam to be used for further communications with the UE. In this example, a fifth beam is selected (identified in FIG. 8B as "e"). Here, in association with the beam re-selection, the base station needs to transmit a third DCI communication to the UE. In this example, since the third DCI communication is to be transmitted within the second set of J slots, the base station transmits the third DCI communication in the second PDCCH monitoring location (e.g., RB10) identified by the indication previously provided by the base station. Because the UE expects to receive a DCI communication (e.g., as a result of the beam quality issue/beam re-selection) within the second set of J slots, the UE monitors the second PDCCH monitoring location (e.g., RB10) indicated by the first DCI communication, and receives the third DCI communication accordingly.

As indicated by reference 854, the base station next transmits, to the UE and using the fifth beam, a fourth SPS PDSCH communication (e.g., a re-transmission of the third SPS PDSCH communication). As shown by reference 856, the UE may receive the fourth SPS PDSCH communication, and may provide, to the base station, an ACK indicating that the fourth SPS PDSCH communication was received. Further operations of the base station and the UE may continue in a similar manner.

As indicated above, FIGS. 8A and 8B are provided as examples. Other examples may differ from what is described with respect to FIGS. 8A and 8B.

Figure 9:
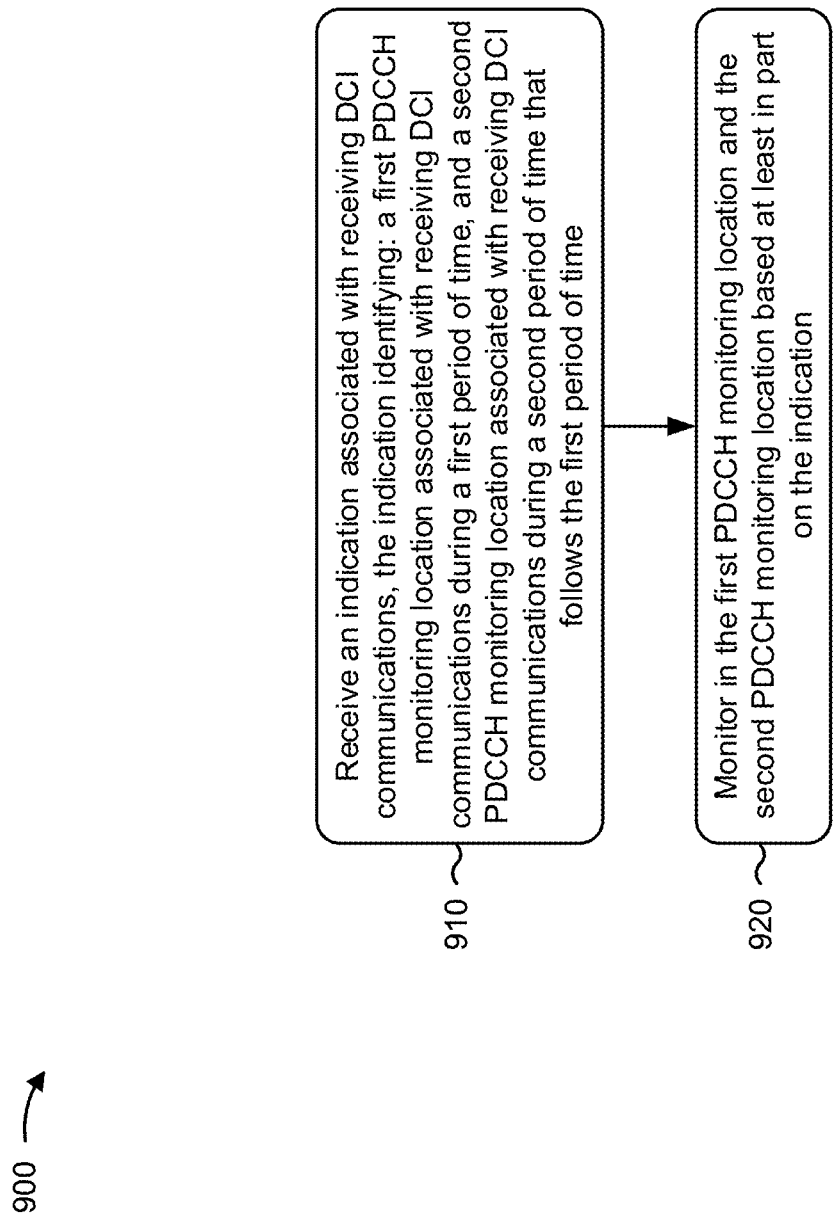
FIG. 9 is a diagram illustrating an example process performed, for example, by a user equipment, in accordance with various aspects of the present disclosure.

FIG. 9 is a diagram illustrating an example process 900 performed, for example, by UE, in accordance with various aspects of the present disclosure. Example process 900 is an example where the UE (e.g., UE 120 and/or the like) performs operations associated with dynamic indication of physical downlink control channel monitoring location.

As shown in FIG. 9, in some aspects, process 900 may include receiving an indication associated with receiving DCI communications, the indication identifying a first PDCCH monitoring location associated with receiving DCI communications during a first period of time, and a second PDCCH monitoring location associated with receiving DCI communications during a second period of time that follows the first period of time (block 910). For example, the UE (e.g., using receive processor 258, controller/processor 280, memory 282, and/or the like) may receive an indication associated with receiving DCI communications, the indication identifying a first PDCCH monitoring location associated with receiving DCI communications during a first period of time, and a second PDCCH monitoring location associated with receiving DCI communications during a second period of time that follows the first period of time, as described above.

As further shown in FIG. 9, in some aspects, process 900 may include monitoring in the first PDCCH monitoring location and the second PDCCH monitoring location based at least in part on the indication (block 920). For example, the UE (e.g., using receive processor 258, controller/processor 280, memory 282, and/or the like) may monitor in the first PDCCH monitoring location and the second PDCCH monitoring location based at least in part on the indication, as described above.

Process 900 may include additional aspects, such as any single aspect or any combination of aspects described below and/or in connection with one or more other processes described elsewhere herein.

In a first aspect, the first PDCCH monitoring location is different from the second PDCCH monitoring location.

In a second aspect, alone or in combination with the first aspect, the first period of time is a period of time corresponding to a first set of slots, and the second period of time is a period of time corresponding to a second set of slots that follows the first set of slots.

In a third aspect, alone or in combination with one or more of the first and second aspects, the indication identifies a total period of time during which the indication is valid.

Here, the total period of time corresponds to a group of slots that includes the first period of time and the second period of time.

In a fourth aspect, alone or in combination with one or more of the first through third aspects, the indication identifies a number of periods of time during which the indication is valid, and a number of slots in each of the first period of time and the second period of time.

In a fifth aspect, alone or in combination with one or more of the first through fourth aspects, the indication identifies a third PDCCH monitoring location associated with receiving DCI communications during the first period of time. Here, the third PDCCH monitoring location is different from the first PDCCH monitoring location.

In a sixth aspect, in combination with the fifth aspect, process 900 includes determining that no DCI communication for the UE is received in the first PDCCH monitoring location, and monitoring in the third PDCCH monitoring location based at least in part on determining that no DCI communication for the UE is received in the first PDCCH monitoring location.

In a seventh aspect, alone or in combination with one or more of the first through sixth aspects, for each of the first PDCCH monitoring location and the second PDCCH monitoring location, the indication includes information associated with at least one of: a frequency domain location, a time domain location, a search space identifier, a CORESET identifier, a periodicity, an offset, a duration, a number of symbols to be monitored, or a number of PDCCH candidates.

In an eighth aspect, alone or in combination with one or more of the first through seventh aspects, the indication is received via at least one of: a DCI communication, RRC signaling, or a MAC CE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
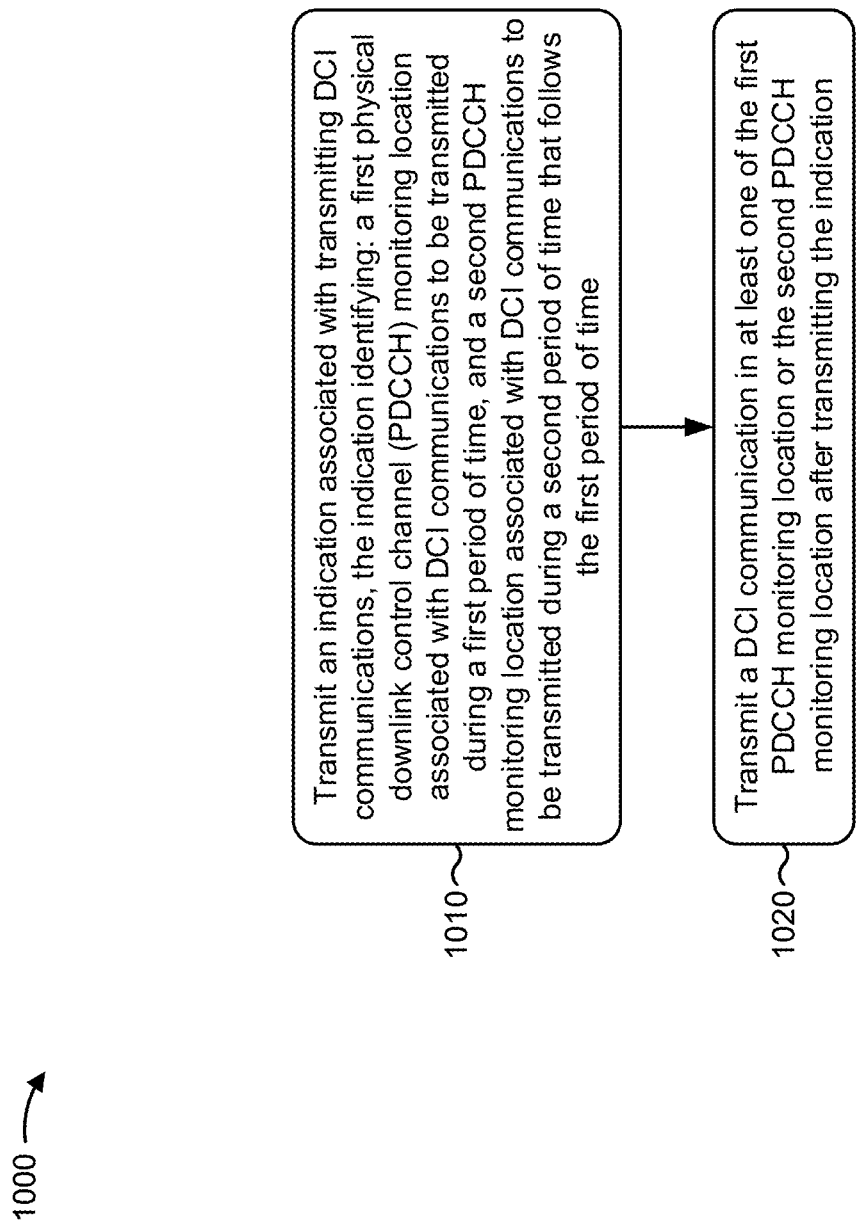
FIG. 10 is a diagram illustrating an example process performed, for example, by a base station, in accordance with various aspects of the present disclosure.

FIG. 10 is a diagram illustrating an example process 1000 performed, for example, by a base station, in accordance with various aspects of the present disclosure. Example process 1000 is an example where the base station (e.g., base station 110 and/or the like) performs operations associated with dynamic indication of physical downlink control channel monitoring location.

As shown in FIG. 10, in some aspects, process 1000 may include transmitting an indication associated with transmitting DCI communications, the indication identifying a first PDCCH monitoring location associated with DCI communications to be transmitted during a first period of time, and a second PDCCH monitoring location associated with DCI communications to be transmitted during a second period of time that follows the first period of time (block 1010). For example, the base station (e.g., using transmit processor 220, controller/processor 240, memory 242, and/or the like) may transmit an indication associated with transmitting DCI communications, the indication identifying a first PDCCH monitoring location associated with DCI communications to be transmitted during a first period of time, and a second PDCCH monitoring location associated with DCI communications to be transmitted during a second period of time that follows the first period of time, as described above.

As further shown in FIG. 10, in some aspects, process 1000 may include transmitting a DCI communication in at least one of the first PDCCH monitoring location or the second PDCCH monitoring location after transmitting the indication (block 1020). For example, the base station (e.g., using transmit processor 220, controller/processor 240, memory 242, and/or the like) may transmit a DCI communication in at least one of the first PDCCH monitoring location or the second PDCCH monitoring location after transmitting the indication, as described above.

Process 1000 may include additional aspects, such as any single aspect or any combination of aspects described below and/or in connection with one or more other processes described elsewhere herein.

In a first aspect, the first PDCCH monitoring location is different from the second PDCCH monitoring location.

In a second aspect, alone or in combination with the first aspect, the first period of time is a period of time corresponding to a first set of slots, and the second period of time is a period of time corresponding to a second set of slots that follows the first set of slots.

In a third aspect, alone or in combination with one or more of the first and second aspects, the indication identifies a total period of time during which the indication is valid. Here, the total period of time corresponds to a group of slots that includes the first period of time and the second period of time.

In a fourth aspect, alone or in combination with one or more of the first through third aspects, the indication identifies a number of periods of time during which the indication is valid, and a number of slots in each of the first period of time and the second period of time.

In a fifth aspect, alone or in combination with one or more of the first through fourth aspects, the indication identifies a third PDCCH monitoring location associated with receiving DCI communications during the first period of time. Here, the third PDCCH monitoring location is different from the first PDCCH monitoring location.

In a sixth aspect, in combination with the fifth aspect, process 1000 includes determining that no DCI communication for a UE (e.g., UE 120) is to be transmitted in the first PDCCH monitoring location; and transmitting a DCI communication in the third PDCCH monitoring location based at least in part on determining that no DCI communication for the UE is to be transmitted in the first PDCCH monitoring location.

In a seventh aspect, alone or in combination with one or more of the first through sixth aspects, for each of the first PDCCH monitoring location and the second PDCCH monitoring location, the indication includes information associated with at least one of: a frequency domain location, a time domain location, a search space identifier, a CORESET identifier, a periodicity, an offset, a duration, a number of symbols to be monitored, or a number of PDCCH candidates.

In an eighth aspect, alone or in combination with one or more of the first through seventh aspects, the indication is transmitted via at least one of: a DCI communication, RRC signaling, or a MAC CE.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    receiving an indication, via a downlink control information (DCI) communication, associated with receiving subsequent DCI communications, the indication identifying:
        a first physical downlink control channel (PDCCH) monitoring location associated with receiving at least one first subsequent DCI communication during a first period of time,
        a second PDCCH monitoring location associated with receiving at least one second subsequent DCI communication during a second period of time that follows the first period of time; and
        a total period of time during which the indication is valid; and
    monitoring in the first PDCCH monitoring location and the second PDCCH monitoring location based at least in part on the indication.

2. The method of claim 1, wherein the first PDCCH monitoring location is different from the second PDCCH monitoring location.

3. The method of claim 1, wherein the first period of time is a period of time corresponding to a first set of slots, and the second period of time is a period of time corresponding to a second set of slots that follows the first set of slots.

4. The method of claim 1,
    wherein the total period of time corresponds to a group of slots that includes the first period of time and the second period of time.

5. The method of claim 1, wherein the indication of the total period of time identifies a number of periods of time during which the indication is valid, and a number of slots in each of the first period of time and the second period of time.

6. The method of claim 1, wherein the indication identifies a third PDCCH monitoring location associated with receiving at least one third subsequent DCI communication during the first period of time,
    wherein the third PDCCH monitoring location is different from the first PDCCH monitoring location.

7. The method of claim 6, further comprising:
    determining that no DCI communication for the UE is received in the first PDCCH monitoring location; and
    monitoring in the third PDCCH monitoring location based at least in part on determining that no DCI communication for the UE is received in the first PDCCH monitoring location.

8. The method of claim 1, wherein, for each of the first PDCCH monitoring location and the second PDCCH monitoring location, the indication includes information associated with at least one of:
    a frequency domain location,
    a time domain location,
    a search space identifier,
    a control resource set (CORESET) identifier,
    a periodicity,
    an offset,
    a duration,
    a number of symbols to be monitored, or
    a number of PDCCH candidates.

9. A method of wireless communication performed by a base station, comprising:
    transmitting an indication, via a downlink control information (DCI) communication, associated with transmitting subsequent DCI communications, the indication identifying:
        a first physical downlink control channel (PDCCH) monitoring location associated with receiving at least one first subsequent DCI communication during a first period of time,
        a second PDCCH monitoring location associated with receiving at least one second subsequent DCI communication during a second period of time that follows the first period of time; and
        a total period of time during which the indication is valid; and
    transmitting a subsequent DCI communication in at least one of the first PDCCH monitoring location or the second PDCCH monitoring location after transmitting the indication.

10. The method of claim 9, wherein the first PDCCH monitoring location is different from the second PDCCH monitoring location.

11. The method of claim 9, wherein the first period of time is a period of time corresponding to a first set of slots, and the second period of time is a period of time corresponding to a second set of slots that follows the first set of slots.

12. The method of claim 9,
wherein the total period of time corresponds to a group of slots that includes the first period of time and the second period of time.

13. The method of claim 9, wherein the indication of the total period of time identifies a number of periods of time during which the indication is valid, and a number of slots in each of the first period of time and the second period of time.

14. The method of claim 9, wherein the indication identifies a third PDCCH monitoring location associated with receiving at least one third subsequent DCI communications during the first period of time,
wherein the third PDCCH monitoring location is different from the first PDCCH monitoring location.

15. The method of claim 14, further comprising:
determining that no DCI communication for a user equipment (UE) is to be transmitted in the first PDCCH monitoring location; and
transmitting a DCI communication in the third PDCCH monitoring location based at least in part on determining that no DCI communication for the UE is to be transmitted in the first PDCCH monitoring location.

16. The method of claim 9, wherein, for each of the first PDCCH monitoring location and the second PDCCH monitoring location, the indication includes information associated with at least one of:
a frequency domain location,
a time domain location,
a search space identifier,
a control resource set (CORESET) identifier,
a periodicity,
an offset,
a duration,
a number of symbols to be monitored, or
a number of PDCCH candidates.

17. A user equipment (UE) for wireless communication, comprising:
one or more memories; and
one or more processors operatively coupled to the memory, the memory and the one or more processors configured to:
receive an indication, via a downlink control information (DCI) communication, associated with receiving subsequent DCI communications, the indication identifying:
a first physical downlink control channel (PDCCH) monitoring location associated with receiving at least one first subsequent DCI communication during a first period of time,
a second PDCCH monitoring location associated with receiving at least one second subsequent DCI communication during a second period of time that follows the first period of time; and
a total period of time during which the indication is valid; and
monitor in the first PDCCH monitoring location and the second PDCCH monitoring location based at least in part on the indication.

18. The UE of claim 17, wherein the first PDCCH monitoring location is different from the second PDCCH monitoring location.

19. The UE of claim 17, wherein the first period of time is a period of time corresponding to a first set of slots, and the second period of time is a period of time corresponding to a second set of slots that follows the first set of slots.

20. The UE of claim 17
wherein the total period of time corresponds to a group of slots that includes the first period of time and the second period of time.

21. The UE of claim 17, wherein the indication of the total period of time identifies a number of periods of time during which the indication is valid, and a number of slots in each of the first period of time and the second period of time.

22. The UE of claim 17, wherein the indication identifies a third PDCCH monitoring location associated with receiving at least one third subsequent DCI communication during the first period of time,
wherein the third PDCCH monitoring location is different from the first PDCCH monitoring location.

23. The UE of claim 17, wherein, for each of the first PDCCH monitoring location and the second PDCCH monitoring location, the indication includes information associated with at least one of:
a frequency domain location,
a time domain location,
a search space identifier,
a control resource set (CORESET) identifier,
a periodicity,
an offset,
a duration,
a number of symbols to be monitored, or
a number of PDCCH candidates.

24. A base station for wireless communication, comprising:
a memory; and
one or more processors operatively coupled to the memory, the memory and the one or more processors configured to:
transmit an indication, via a downlink control information (DCI) communication, associated with transmitting subsequent DCI communications, the indication identifying:
a first physical downlink control channel (PDCCH) monitoring location associated with receiving at least one first subsequent DCI communication during a first period of time,
a second PDCCH monitoring location associated with receiving at least one second subsequent DCI communication during a second period of time that follows the first period of time; and
a total period of time during which the indication is valid; and
transmit a subsequent DCI communication in at least one of the first PDCCH monitoring location or the second PDCCH monitoring location after transmitting the indication.

25. The base station of claim 24, wherein the first PDCCH monitoring location is different from the second PDCCH monitoring location.

26. The base station of claim 24, wherein the first period of time is a period of time corresponding to a first set of slots, and the second period of time is a period of time corresponding to a second set of slots that follows the first set of slots.

27. The base station of claim 24, wherein the total period of time corresponds to a group of slots that includes the first period of time and the second period of time.

28. The base station of claim 24, wherein the indication of the total period of time identifies a number of periods of time during which the indication is valid, and a number of slots in each of the first period of time and the second period of time.

* * * * *